United States Patent
Klein et al.

(10) Patent No.: US 8,296,151 B2
(45) Date of Patent: Oct. 23, 2012

(54) COMPOUND GESTURE-SPEECH COMMANDS

(75) Inventors: Christian Klein, Duvall, WA (US); Ali M. Vassigh, Redmond, WA (US); Jason S. Flaks, Bellevue, WA (US); Vanessa Larco, Kirkland, WA (US); Thomas M. Soemo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 137 days.

(21) Appl. No.: 12/818,898

(22) Filed: Jun. 18, 2010

(65) Prior Publication Data

US 2011/0313768 A1    Dec. 22, 2011

(51) Int. Cl.
G10L 15/00    (2006.01)
G10L 21/00    (2006.01)

(52) U.S. Cl. ......... 704/275; 704/251; 704/270; 382/181
(58) Field of Classification Search .................. 704/251, 704/270, 272, 275; 382/181, 195
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |

(Continued)

FOREIGN PATENT DOCUMENTS

CN    101254344 B    6/2010

(Continued)

OTHER PUBLICATIONS

Qian, et al., "A Gesture-Driven Multimodal Interactive Dance System," 2004 IEEE International Conference on Multimedia and Expo (ICME), 2004, pp. 1579-1582.

(Continued)

*Primary Examiner* — James Wozniak
(74) *Attorney, Agent, or Firm* — Vierra Magen Marcus & DeNiro LLP

(57) ABSTRACT

A multimedia entertainment system combines both gestures and voice commands to provide an enhanced control scheme. A user's body position or motion may be recognized as a gesture, and may be used to provide context to recognize user generated sounds, such as speech input. Likewise, speech input may be recognized as a voice command, and may be used to provide context to recognize a body position or motion as a gesture. Weights may be assigned to the inputs to facilitate processing. When a gesture is recognized, a limited set of voice commands associated with the recognized gesture are loaded for use. Further, additional sets of voice commands may be structured in a hierarchical manner such that speaking a voice command from one set of voice commands leads to the system loading a next set of voice commands.

20 Claims, 21 Drawing Sheets

U.S. PATENT DOCUMENTS

| | | | |
|---|---|---|---|
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,570,555 B1 | 5/2003 | Prevost et al. |
| 6,594,629 B1 * | 7/2003 | Basu et al. .................. 704/251 |
| 6,622,119 B1 * | 9/2003 | Ramaswamy et al. ............ 704/9 |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 6,964,023 B2 * | 11/2005 | Maes et al. .................... 715/811 |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,492,367 B2 | 2/2009 | Mahajan et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,627,139 B2 | 12/2009 | Marks et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |

| | | | |
|---|---|---|---|
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2003/0023435 A1* | 1/2003 | Josephson | 704/235 |
| 2003/0065505 A1 | 4/2003 | Johnston et al. | |
| 2004/0119754 A1 | 6/2004 | Bangalore et al. | |
| 2004/0193413 A1* | 9/2004 | Wilson et al. | 704/243 |
| 2006/0075422 A1 | 4/2006 | Choi et al. | |
| 2007/0213984 A1* | 9/2007 | Ativanichayaphong et al. | 704/257 |
| 2008/0026838 A1 | 1/2008 | Dunstan et al. | |
| 2008/0152191 A1 | 6/2008 | Fujimura et al. | |
| 2008/0252596 A1 | 10/2008 | Bell et al. | |
| 2009/0077504 A1 | 3/2009 | Bell et al. | |
| 2009/0100383 A1* | 4/2009 | Sunday et al. | 715/863 |
| 2009/0141933 A1 | 6/2009 | Wagg | |
| 2009/0215533 A1 | 8/2009 | Zalewski et al. | |
| 2009/0221368 A1 | 9/2009 | Yen et al. | |
| 2010/0093435 A1 | 4/2010 | Glaser et al. | |
| 2010/0207875 A1* | 8/2010 | Yeh | 345/156 |
| 2010/0217604 A1* | 8/2010 | Baldwin et al. | 704/275 |
| 2011/0001699 A1* | 1/2011 | Jacobsen et al. | 345/157 |

FOREIGN PATENT DOCUMENTS

| | | |
|---|---|---|
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | WO2009059065 | 5/2009 |
| WO | 2010006087 A1 | 1/2010 |

OTHER PUBLICATIONS

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Vo, "A Multi-Modal Human-Computer Interface: Combination of Gesture and Speech Recognition", INTERACT '93 and CHI '93 conference companion on Human factors in computing systems Conference on Human Factors in Computing Systems, Apr. 1993, pp. 69-70, ACM, New York, NY, USA.

Carbini, "Context Dependent Interpretation of Multimodal Speech-Pointing Gesture Interface", Proceedings of the International Conference on Multimodal Interfaces, Oct. 2005, pp. 14, IEEE CS Press.

Tse, "Multimodal Multiplayer Tabletop Gaming", Mitsubishi Electric Research Laboratories, Third International Workshop on Pervasive Gaming Applications-PerGames, May 7, 2006, Dublin, Ireland.

Kelly, "Two Sides of the Same Coin: Speech and Gesture Mutually Interact to Enhance Comprehension", Association for Psychological Science, Research Article, Dec. 22, 2009, pp. 1-8, SAGE Journals Online.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Voluntary Amendments dated Mar. 31, 2012, Chinese Patent Application No. 201110177728.8.

* cited by examiner

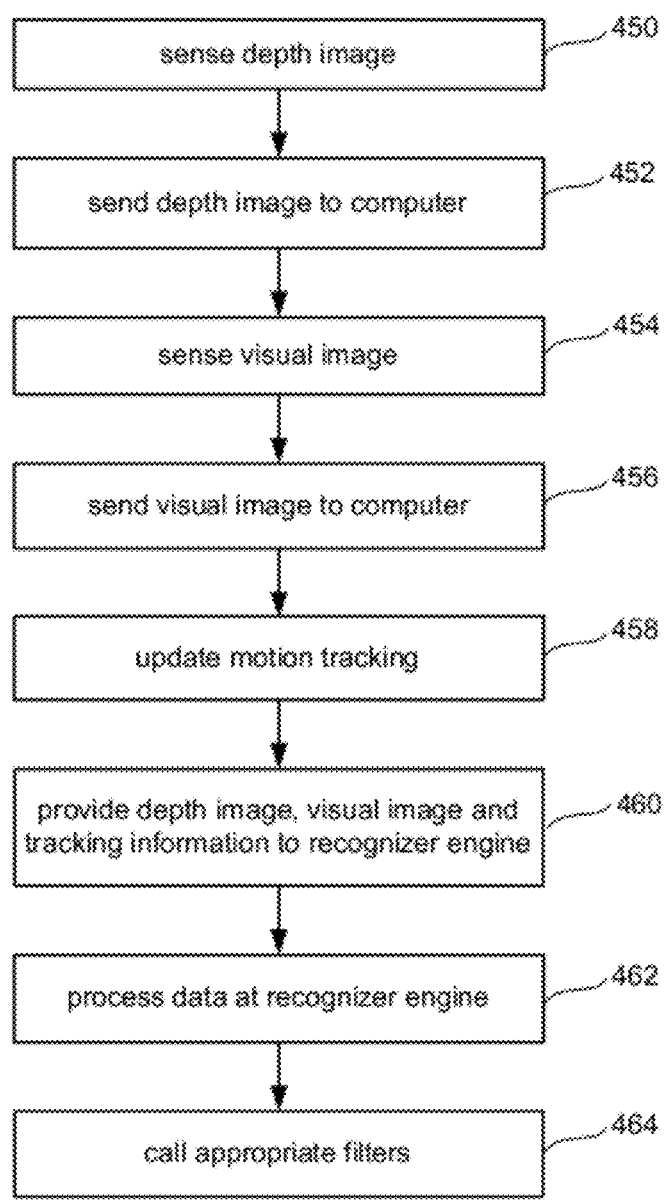

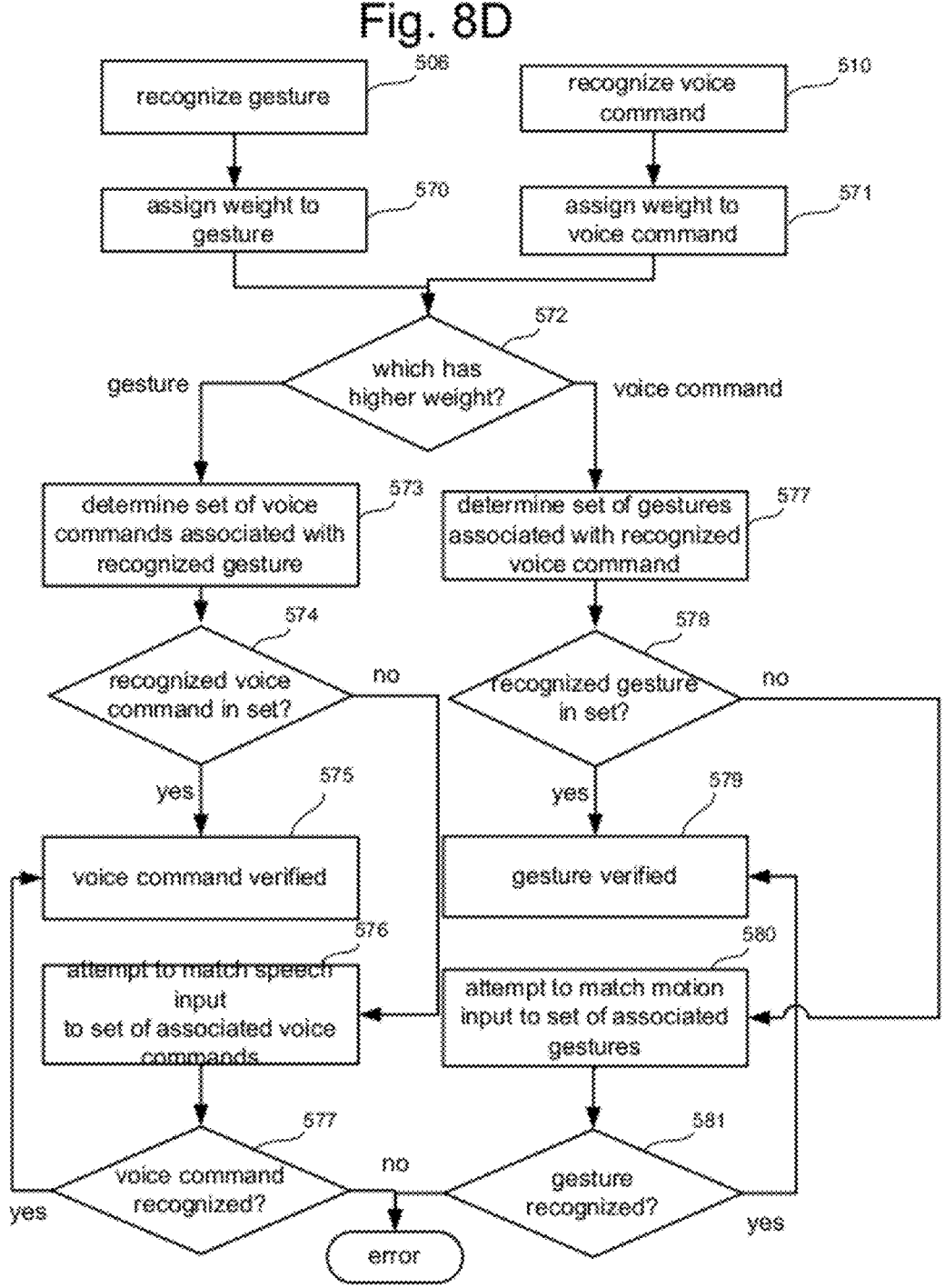

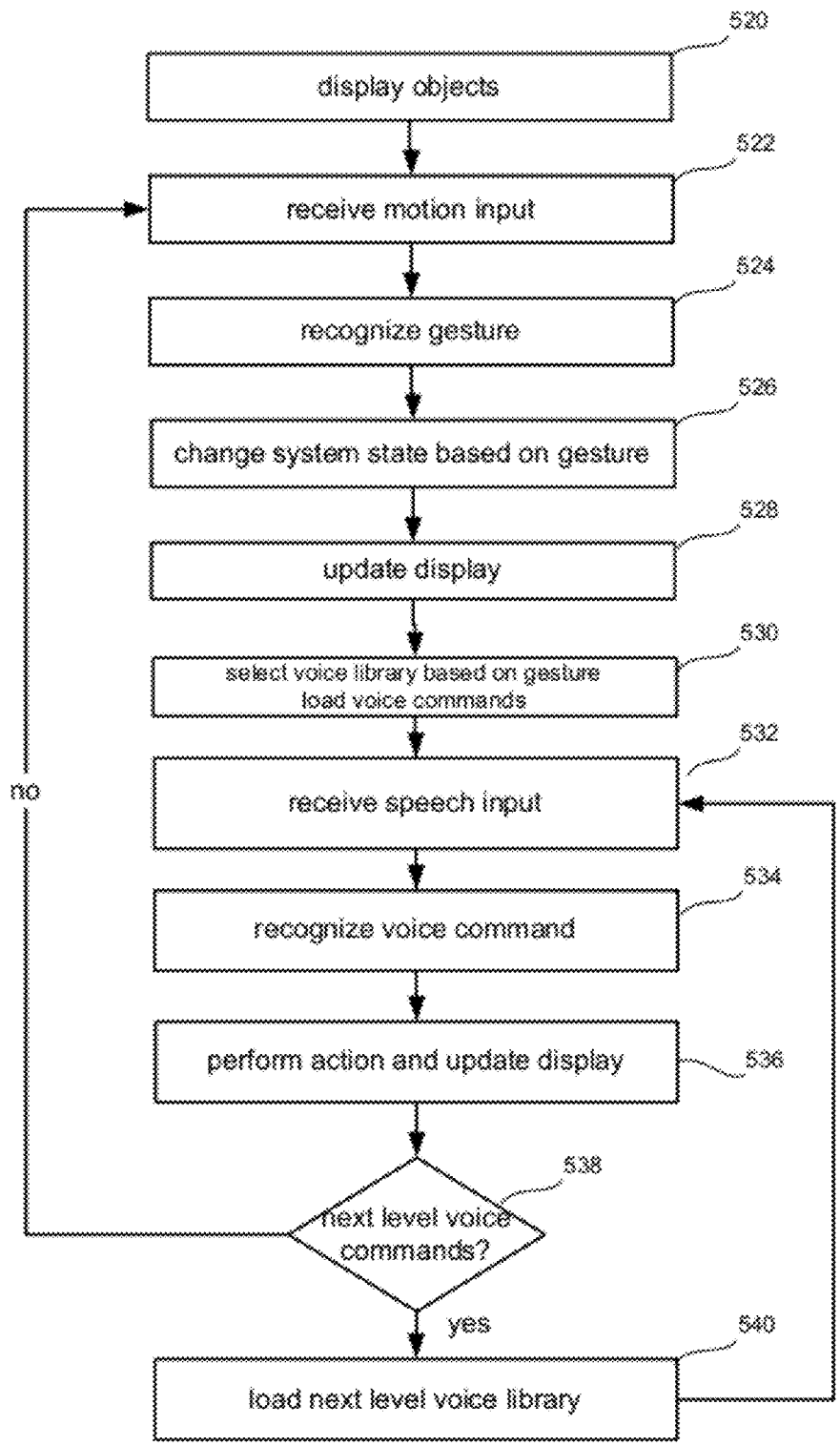

COMPOUND GESTURE-SPEECH COMMANDS

BACKGROUND

Users of computer games and other multimedia applications are typically provided with user controls which allow the users to accomplish basic functions, such as browse and select content, as well as perform more sophisticated functions, such as manipulate game characters. Typically, these controls are provided as inputs to a controller through an input device, such as a mouse, keyboard, microphone, image source, audio source, remote controller, and the like. Unfortunately, learning and using such controls can be difficult or cumbersome, thus creating a barrier between a user and full enjoyment of such games, applications and their features.

SUMMARY

Systems and methods for using compound commands incorporating both sounds, such as speech or a hand-clap, and body positions, such as a pose or gesture, are disclosed. Multimedia objects are displayed on a user interface. A controller for the user interface includes a capture device for capturing any sounds made by the user as well as the static and dynamic body position of the user, including poses or gestures. The controller processes the captured data in order to recognize body position commands and sound commands.

Advantageously, using a combination of body position commands and sound commands allows the system to be implemented with smaller command sets distributed over different levels of operational states. Processing the combination of body position commands and sound commands thus enhances the reliability and accuracy of the recognition software.

For example, the capture device may capture input related to a body position movement and recognize the movement as a defined gesture. Given that captured input, a limited set of voice or sound commands associated with that recognized gesture may be identified and loaded into a controller. When sound input is received, it is recognized based on the loaded sound command set. Finally, an action is performed based on the combination of the recognized gesture along with the recognized sound command.

Advantageously, contextual menus may be provided on a user interface as help to the user in listing available voice or sound commands, and these contextual menus may be hierarchical in nature. For example, a first gesture may lead to using a first voice library. However, upon speaking a voice command from the first voice library, another set of voice commands may become available, and a second voice library may be loaded into the controller. In similar manner, different levels of voice commands may be introduced to the user in contextual menus when appropriate.

The capture device may capture both body position input and sound input at approximately the same time. In this event, the body position input may be used to provide context to verify the sound command, or the sound command may be used to provide context to verify the body position command. Further, weights may be assigned to the recognized commands in order to help provide the context for deciding the proper interpretation of the body position input and/or the sound input.

This Summary is provided to introduce a selection of concepts in a simplified form that are further described below in the Detailed Description. A further understanding of the nature and advantages of the device and methods disclosed herein may be realized by reference to the complete specification and the drawings. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 7C-7D are flow charts describing additional details for recognizing hand gestures in the process shown in FIG. 7A.

FIG. 8D is a flow chart describing another option for correlating a gesture with a voice command in accord with FIG. 8A.

FIG. 9A is a flow chart describing an alternative embodiment of a process for user interaction with a computing system using hand gestures and voice commands.

DETAILED DESCRIPTION

Compound commands for multimedia entertainment systems may incorporate both sound commands and body position commands. Multimedia objects are displayed on a user interface. A controller for the user interface includes a capture device for capturing the body position and any movements of the user, as well as any sounds made by the user. The controller processes the captured information in order to recognize predefined sound commands and body position commands, including poses, gestures and voice commands. As used herein, the term "gestures" is intended to encompass all body position commands, whether comprised of static poses or dynamic movements such as hand gestures.

In one embodiment, once a gesture is recognized, then a set of sound or voice commands that relate to that gesture are loaded into the controller. In that way, a more limited and precise set of sound or voice commands may be provided to the user. For example, the user speaks, and the controller recognizes the speech as a voice command. In response to the recognized voice command, a predefined action is performed. Help menus/messages may be displayed on the interface which show the state of operation and available sound/voice commands that relate to displayed objects.

In another embodiment, a first voice command is used to narrow down the set of subsequent voice commands to a smaller subset of voice commands associated with the first voice command. For example, when the user speaks a first voice command, a help message or menu can be displayed that indicates to the user the set of voice commands that can follow the first voice command. When the entire set of related voice commands is received and recognized, the requisite action may be performed. Alternatively, a combination of gestures and partial voice commands may guide the user through each level of commands using helpful contextual menus.

In another embodiment, the gesture and the voice command are received virtually simultaneously (or otherwise overlapping in time), and both recognition schemes are correlated so that the accuracy and confidence associated with recognition are increased. Further, the number of available gestures and voice commands for a particular state of operation may be much smaller for each incremental portion of the application, thus simplifying both the use of the system and the processing schemes.

Figure 1:
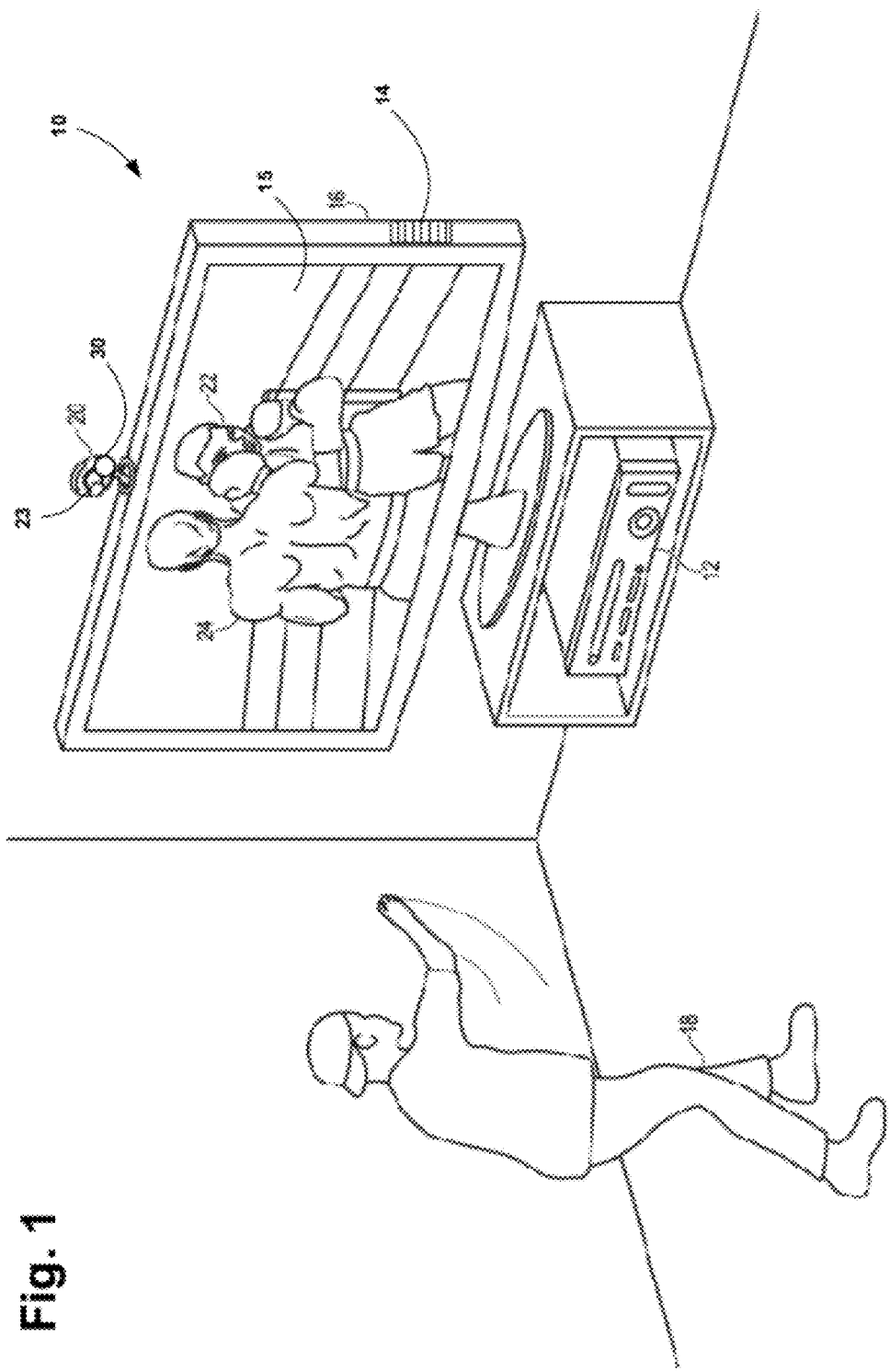
FIG. 1 illustrates a user in an exemplary multimedia environment having a capture device for capturing and tracking user body positions and movements and receiving user sound commands.

FIG. 1 illustrates a user 18 interacting with a multimedia entertainment system 10 in a boxing video game. Advantageously, the system 10 is configured to capture, analyze and track movements and sounds made by the user 18 within range of a capture device 20 of system 10. This allows the user to interact with the system 10 using speech commands, gestures, or a combination of gestures and speech commands, as further described below.

System 10 includes a controller 12 running the boxing application. The controller 12 is a computing system, such as a computer, gaming system, multimedia console, or the like. In one embodiment, the computing system 12 includes hardware components and/or software components such that computing system 12 is used to execute applications, such as gaming applications or other applications. In one embodiment, computing system 12 includes a processor such as a standardized processor, a specialized processor, a microprocessor, or the like, that executes instructions stored on a processor readable storage device for performing the processes described below. For example, the movements and sounds captured by capture device 20 are sent to the controller 12 for processing, where recognition software will analyze the movements and sounds to determine their meaning within the context of the application.

The capture device 20 may include a camera or imaging device 23 that visually monitors one or more users, such as user 18, such that body positions and movements, such as poses, gestures and/or other movements performed by users, may be captured, analyzed and tracked to perform one or more actions or controls within the application, and/or to animate an avatar or on-screen character. Further, the capture device 20 may include a microphone 30 to detect voice commands and other sounds issued by the user 18, such as a hand clap. Details of the capture device are described in co-pending U.S. application Ser. No. 12/722,587, filed Mar. 12, 2010, entitled Bionic Motion, and incorporated herein by reference in its entirety.

System 10 is connected to an audiovisual device 16, which includes a display device 15 for application graphics, such as a television, monitor, high-definition television (HDTV), or other display device, and/or an audio playback device, such as speaker 14. For example, the controller 12 may include a video adapter such as a graphics card and/or an audio adapter such as a sound card that provide audio and video signals associated with an application running on the controller 12. The audiovisual device 16 receives the audio and video signals from the controller 12 and plays the content. According to one embodiment, the audiovisual device 16 may be connected to the controller 12 via a standard connection, such as an S-Video cable, a coaxial cable, an HDMI cable, a DVI cable, a VGA cable, component video cable, or the like, such that video signals received from the controller are displayed on display monitor 15 and audio signals received from the controller are played back through the speaker 14.

In the boxing game application depicted in FIG. 1, the controller 12 also drives the audiovisual device 16 to provide a visual representation of a boxing opponent 22 for the user 18. Advantageously, the controller 12 also provides a visual representation or avatar 24 of the user 18, and the user controls the avatar with his or her own movements. For example, the user 18 may throw a punch in physical space which causes the user avatar 24 to throw a punch in the game space. Thus, according to an example embodiment, the computer system 12 and the capture device 20 recognize and analyze the punch of the user 18 in physical space such that the punch may be interpreted as a game control of the user avatar 24 in game space and/or the motion of the punch may be used to animate the user avatar 24 in game space.

Other movements by the user 18 may also be interpreted as other controls or actions in the application and/or used to animate the user avatar, such as controls to bob, weave, shuffle, block, jab, or throw a variety of different power punches. Furthermore, some movements may be interpreted as controls that may correspond to actions other than controlling the user avatar 24. For example, in one embodiment, the user may use movements to end, pause, or save a game, select a level, view high scores, communicate with a friend, etc.

According to other embodiments, the user 18 may use poses or movements to select the game or other application from a main user interface, such as pointing to the object. Thus, in example embodiments, a full range of motion of the user 18 may be available, used, and analyzed in any suitable manner to interact with an application, as well as static positioning, such as a pointing gesture.

According to other example embodiments, the tracking system 10 may further be used to interpret target movements as operating system and/or application controls that are outside the realm of games. For example, virtually any controllable aspect of an operating system and/or application may be controlled by movements of the target such as the user 18.

Figure 2:
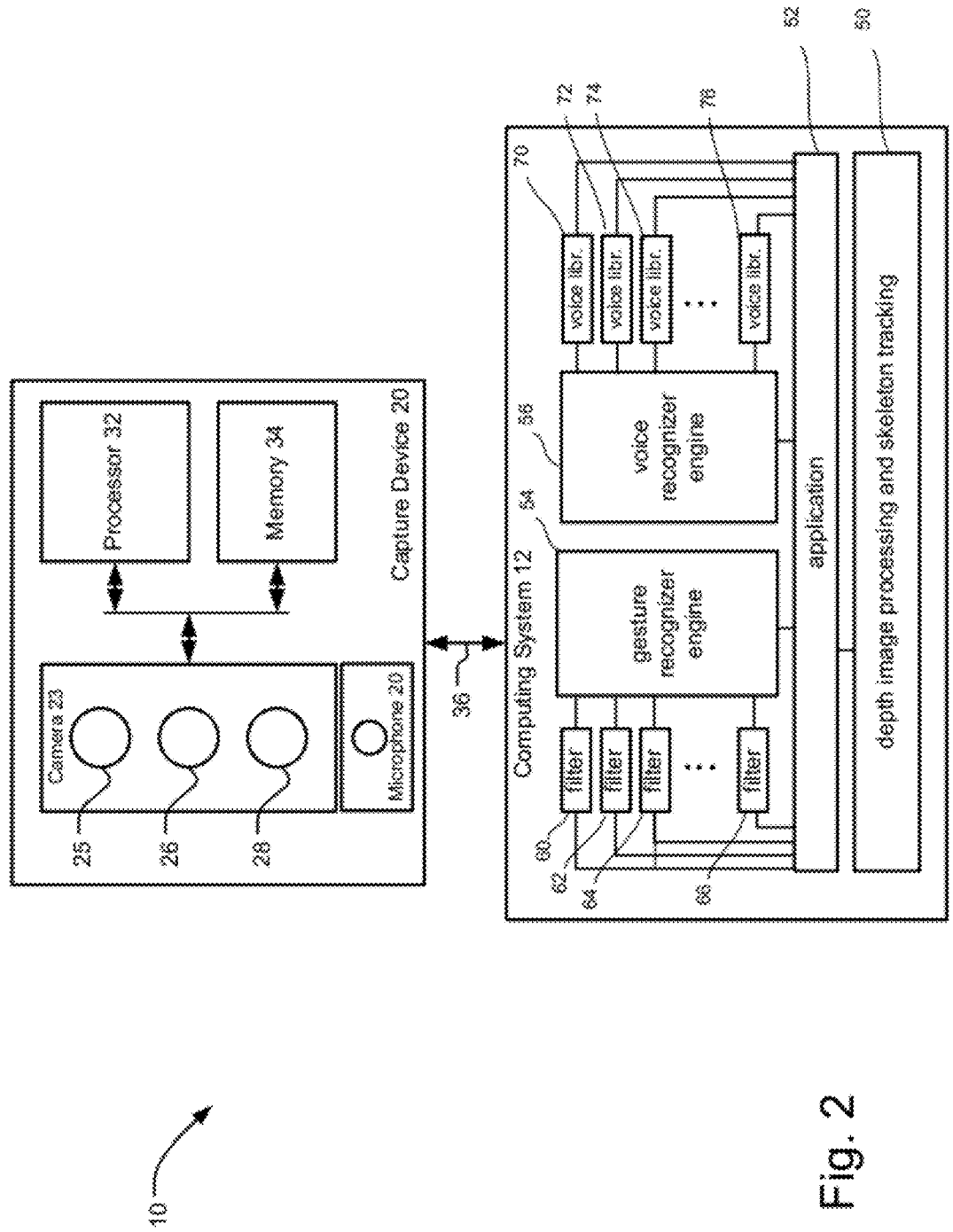
FIG. 2 is a block diagram illustrating one embodiment of a capture device coupled to a computing device.

FIG. 2 illustrates one embodiment of the capture device 20 as coupled to computing device 12. The capture device 20 is configured to capture both audio and video information, such as poses or movements made by user 18, or sounds like voice commands issued by user 18. The captured video has depth information, including a depth image that may include depth values obtained with any suitable technique, including, for example, time-of-flight, structured light, stereo image, or other known methods. According to one embodiment, the capture device 20 may organize the depth information into "Z layers," i.e., layers that are perpendicular to a Z axis extending from the depth camera along its line of sight.

The capture device 20 includes a camera component 23, such as a depth camera that captures a depth image of a scene. The depth image includes a two-dimensional (2D) pixel area of the captured scene, where each pixel in the 2D pixel area may represent a depth value, such as a distance in centimeters, millimeters, or the like, of an object in the captured scene from the camera.

As shown in the embodiment of FIG. 2, the camera component 23 includes an infrared (IR) light component 25, a three-dimensional (3D) camera 26, and an RGB (visual image) camera 28 that is used to capture the depth image of a scene. For example, in time-of-flight analysis, the IR light component 25 of the capture device 20 emits an infrared light onto the scene and then senses the backscattered light from the surface of one or more targets and objects in the scene using, for example, the 3D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern, a stripe pattern, or different pattern) may be projected onto the scene via, for example, the IR light component 25. Upon striking the surface of one or more targets or objects in the scene, the pattern may become deformed in response. Such a deformation of the pattern may be captured by, for example, the 3-D camera 26 and/or the RGB camera 28 (and/or other sensor) and may then be analyzed to determine a physical distance from the capture device to a particular location on the targets or objects. In some implementations, the IR Light component 25 is displaced from the cameras 28 and 26 so triangulation can be used to determined distance from cameras 28 and 26. In some implementations, the capture device 20 will include a dedicated IR sensor to sense the IR light, or a sensor with an IR filter.

According to another embodiment, the capture device 20 may include two or more physically separated cameras that may view a scene from different angles to obtain visual stereo data that may be resolved to generate depth information. Other types of depth image sensors can also be used to create a depth image.

More details can be found in the following U.S. patent applications, each of which is incorporated herein by reference: U.S. patent application Ser. No. 12/422,661, filed Apr. 13, 2009, entitled "Gesture Recognizer System Architecture;" U.S. patent application Ser. No. 12/722,587, filed Mar. 12, 2010, entitled "Bionic Motion;" U.S. patent application Ser. No. 12/391,150, filed Feb. 23, 2009, entitled "Standard Gestures;" and U.S. patent application Ser. No. 12/474,655, filed May 29, 2009, entitled "Gesture Tool."

The capture device 20 further includes a microphone 30. The microphone 30 includes a transducer or sensor that receives and converts sound into an electronic signal in well known manner. According to one embodiment, the microphone 30 is used to reduce feedback between the capture device 20 and the controller 12 in system 10. Additionally, the microphone 30 may be used to receive sounds including voice commands that are generated by the user 18 to select and control applications, including game and other applications that are executed by the controller 12.

The capture device 20 also includes a memory component 34 that stores the instructions that are executed by processor 32, images or frames of images captured by the 3-D camera 26 and/or RGB camera 28, sound signals captured by microphone 30, or any other suitable information, images, sounds, or the like. According to an example embodiment, the memory component 34 may include random access memory (RAM), read only memory (ROM), cache, flash memory, a hard disk, or any other suitable storage component. As shown in FIG. 2, in one embodiment, memory component 34 may be a separate component in communication with the image capture component 23 and the processor 32. According to another embodiment, the memory component 34 may be integrated into processor 32 and/or the image capture component 23.

As shown in FIG. 2, capture device 20 may be in communication with the controller or computing system 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing system 12 may provide a clock to the capture device 20 that may be used to determine when to capture, for example, a scene via the communication link 36. Additionally, the capture device 20 provides the depth information and visual (e.g., RGB) images captured by, for example, the 3-D camera 26 and/or the RGB camera 28 to the computing system 12 via the communication link 36. In one embodiment, the depth images and visual images are transmitted at 30 frames per second. The computing system 12 may then use the model, depth information, and captured images to, for example, control an application such as a game or word processor and/or animate an avatar or on-screen character.

FIG. 2 depicts various software modules. For example, computing system 12 includes depth image processing and skeletal tracking module 50, which uses the depth images to track one or more persons detectable by the depth camera. Depth image processing and skeletal tracking module 50 provides the tracking information to application 196, which can be a video game, productivity application, communications application or other software application etc. The audio data and visual image data is also provided to application 52 and depth image processing and skeletal tracking module 50. Application 52 provides the tracking information, visual image data to gesture recognizer engine 54 and the audio data to voice recognizer engine 56. In another embodiment, gesture recognizer engine 54 receives the tracking information directly from depth image processing and skeletal tracking module 50 and visual image data directly from capture device 20, and voice recognizer engine 56 receives the audio data directly from capture device 20.

Gesture recognizer engine 54 is associated with a collection of filters 60, 62, 64 . . . 66 each having information concerning a gesture, action or condition that may be performed by any person or object detectable by capture device 20. For example, the data from capture device 20 may be processed by filters 60, 62, 64 . . . 66 to identify when a user or group of users has performed one or more gestures or other actions, such as poses or other static body positions. Those gestures may be associated with various controls, objects or conditions of application 52. Thus, the computing environment 12 may use the gesture recognizer engine 54, with the filters, to interpret movements.

Likewise, voice recognizer engine 56 is associated with a collection of voice libraries 70, 72, 74 . . . 76 each having information concerning voice commands that are associated with a particular gesture performed by a user detectable with capture device 20. For example, the data from capture device 20 may be processed by filters 70, 72, 74 . . . 76 to identify the specific and limited set of voice commands or other sound commands that are available when a user or group of users has performed particular gestures that are recognized by system 10. The combination of gestures and voice commands may be associated with various controls, objects or conditions of application 52. Thus, the computing environment 12 may use the gesture recognizer engine 54, with the filters, to interpret poses or movements, and may use the voice recognizer engine 56, with the voice libraries, to interpret sounds.

Capture device 20 of FIG. 2 provides RGB images (or visual images in other formats or color spaces) and depth images to computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device.

Figure 3:
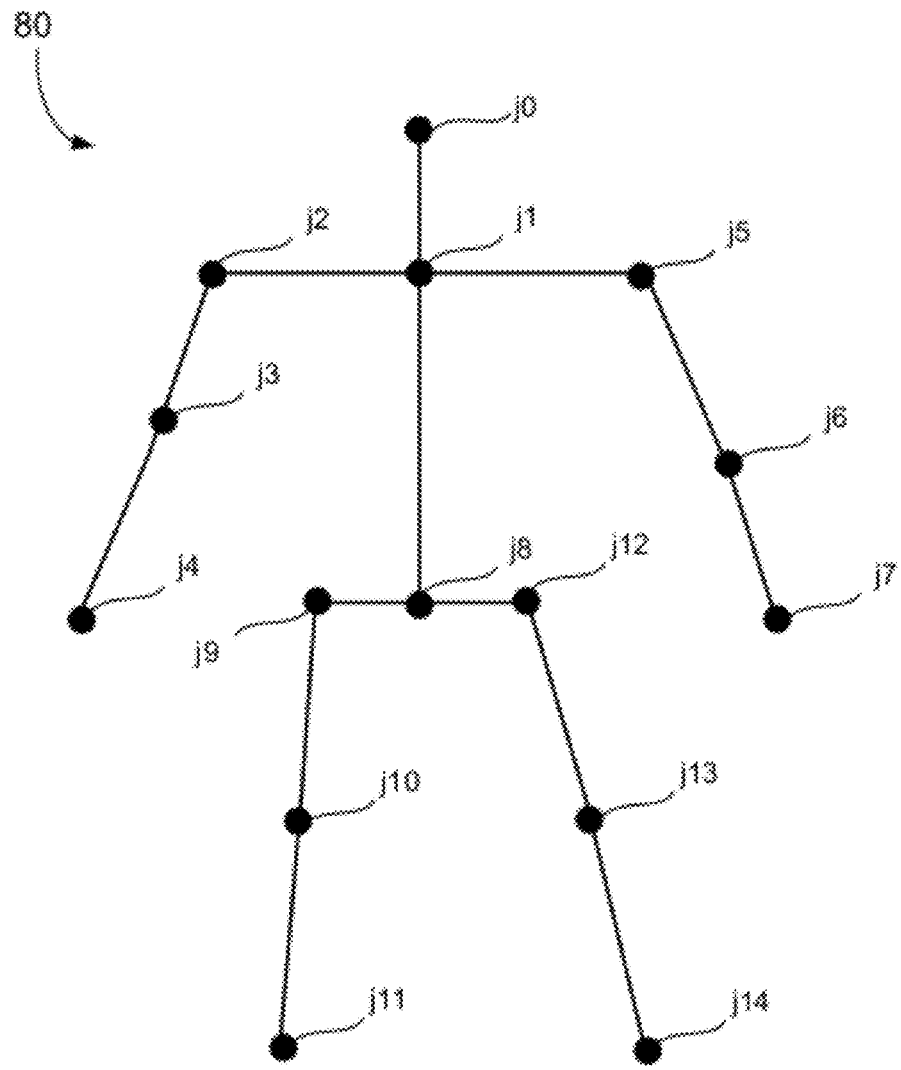
FIG. 3 is a schematic representation of a skeleton being tracked.

The system will use the RGB images and depth images to track a user's position and/or movements. For example, the system will track a skeleton of a person using the depth images. There are many methods that can be used to track the skeleton of a person using depth images. One suitable example of tracking a skeleton using depth image is provided in U.S. patent application Ser. No. 12/603,437, filed Oct. 21, 2009, entitled "Pose Tracking Pipeline," incorporated herein by reference in its entirety. The process disclosed in the '437 Application includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. FIG. 3 shows an example skeleton with 15 joints (j0, j1, j2, j3, j4, j5, j6, j7, j8, j9, j10, j11, j12, j13, and j14). Each of the joints represents a place in the skeleton where the skeleton can pivot in the x, y, z directions or a place of interest on the body. Other methods for tracking can also be used. Suitable tracking technology is also disclosed in the following U.S. patent applications, all of which are incorporated herein by reference in their entirety: U.S. patent application Ser. No. 12/475,308, filed May 29, 2009, entitled "Device for Identifying and Tracking Multiple Humans Over Time;" U.S. application Ser. No. 12/696,282, filed Jan. 29, 2010, entitled "Visual Based Identity Tracking;" U.S. patent application Ser. No. 12/641,788, filed Dec. 18, 2009, entitled "Motion Detection Using Depth Images;" and U.S. patent application Ser. No. 12/575,388, filed Oct. 7, 2009, entitled "Human Tracking System."

Gesture recognizer engine 54 (of computing system 12 depicted in FIG. 2) includes multiple filters 60, 62, 64 . . . 66 to determine a gesture or action. A filter comprises information defining a gesture, action or condition along with parameters, or metadata, for that gesture, post, action or condition. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand must travel (either absolute, or relative to the size of the user as a whole), and a confidence rating by the recognizer engine that the gesture occurred. These parameters for the gesture may vary between applications, between contexts of a single application, or within one context of one application over time.

Filters may be modular or interchangeable. In one embodiment, a filter has a number of inputs (each of those inputs having a type) and a number of outputs (each of those outputs having a type). A first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

The gesture recognizer engine 54 may have a base recognizer engine that provides functionality to the filters. In one embodiment, the functionality that the gesture recognizer engine 54 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 60, 62, 64 . . . 66 are loaded and implemented on top of the gesture recognizer engine 54 and can utilize services provided by gesture recognizer engine 54 to all filters 60, 62, 64 . . . 66. In one embodiment, gesture recognizer engine 54 receives data to determine whether it meets the requirements of any filter 60, 62, 64 . . . 66. Since these provided services, such as parsing the input, are provided once by gesture recognizer engine 54 rather than by each filter 60, 62, 64 . . . 66, such a service need only be processed once in a period of time as opposed to once per filter for that period, so the processing required to determine gestures is reduced.

Application 52 may use the filters 60, 62, 64 . . . 66 provided with the gesture recognizer engine 54, or it may provide its own filter, which plugs in to gesture recognizer engine 54. In one embodiment, all filters have a common interface to enable this plug-in characteristic. Further, all filters may utilize parameters, so a single gesture tool below may be used to debug and tune the entire filter system.

More information about gesture recognizer engine 54 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009. both of which are incorporated herein by reference in their entirety.

Figure 4:
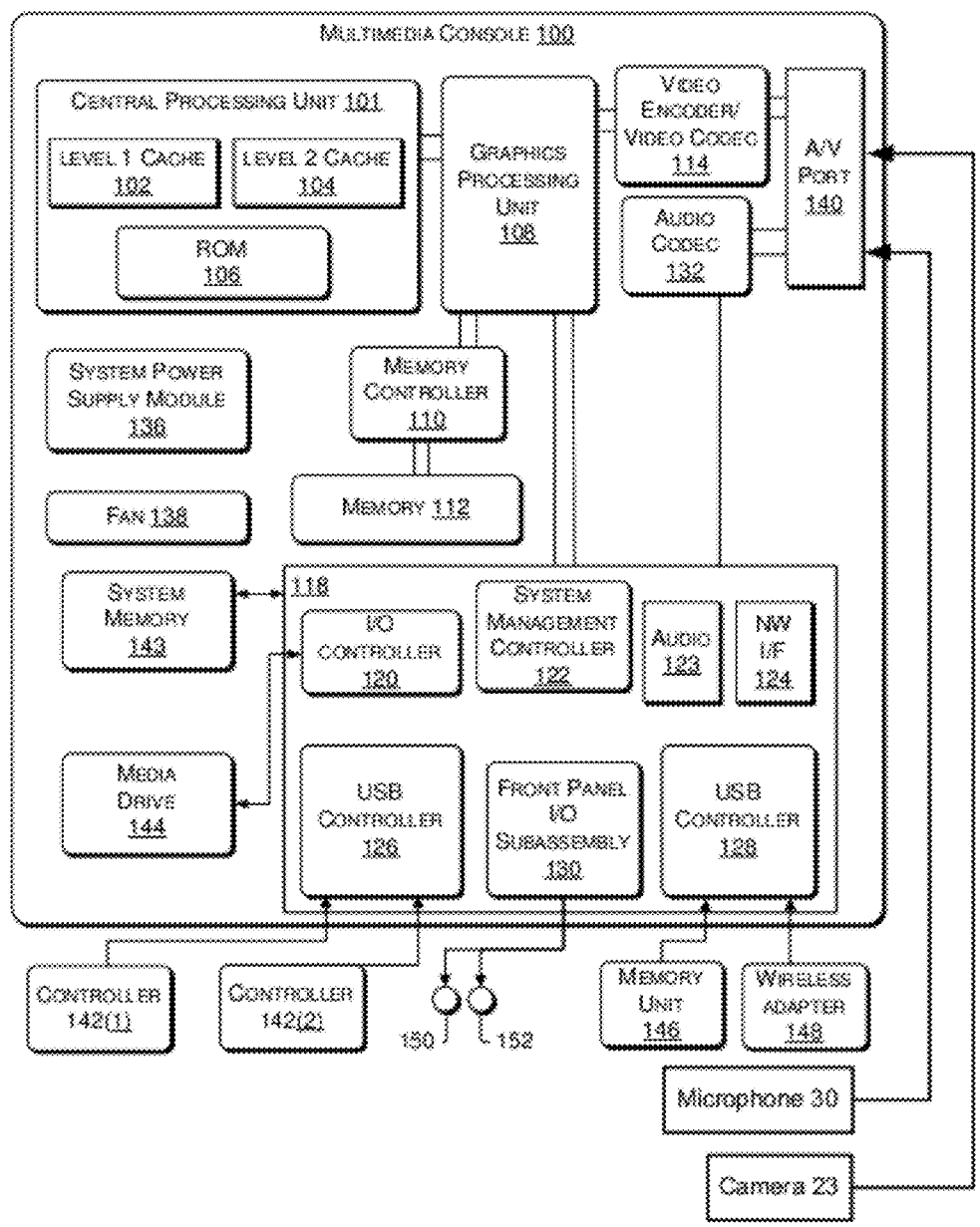
FIG. 4 is a block diagram illustrating one embodiment of a computing system for processing data received from a capture device.

FIG. 4 illustrates one embodiment of the controller 12 shown in FIG. 1 implemented as a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller no is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, Blu-Ray drive, hard disk drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio user or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. For example, the cameras 26, 28 and capture device 20 may define additional input devices for the console 100 via USB controller 126 or other interface.

Figure 5:
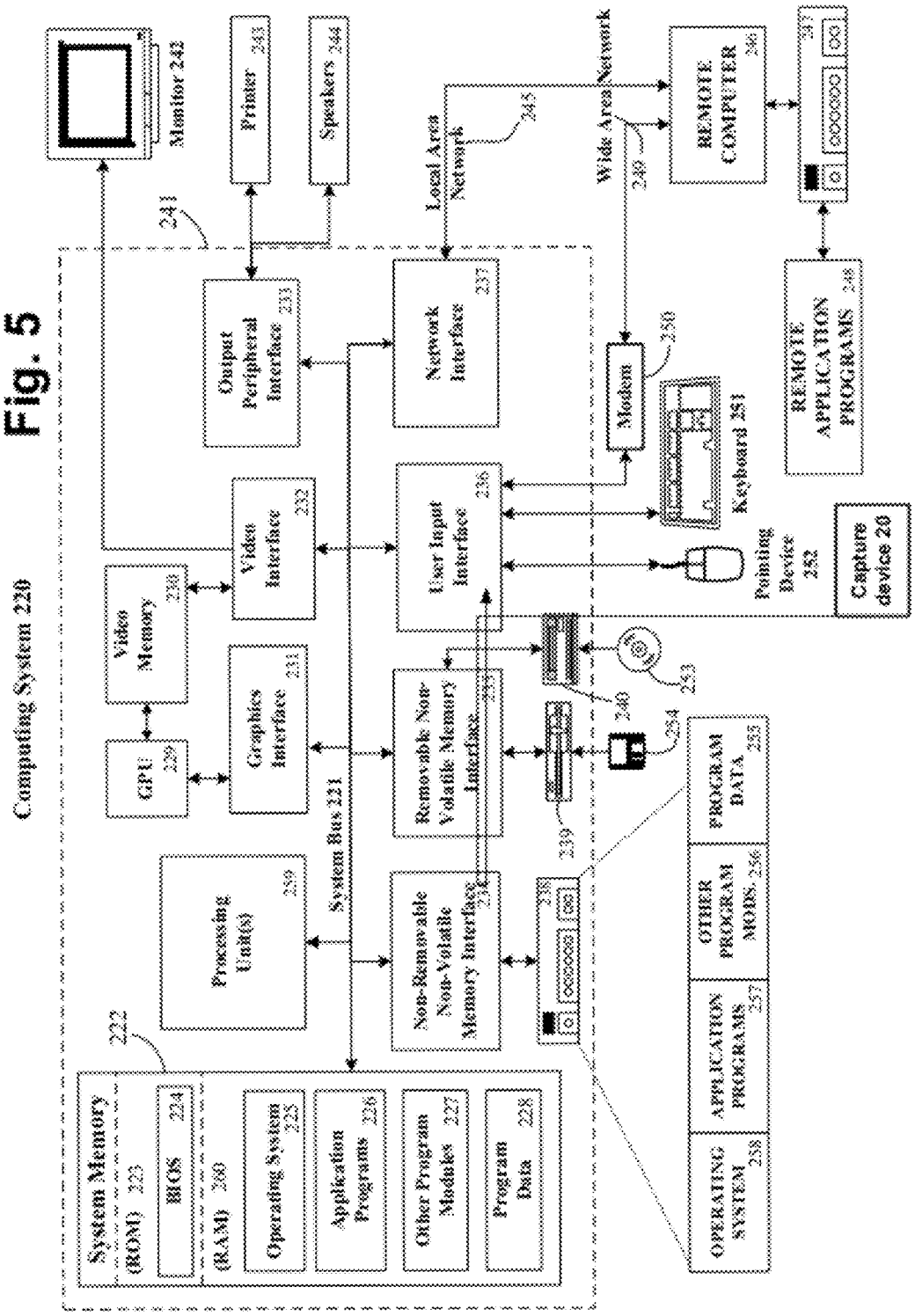
FIG. 5 is a block diagram illustrating another embodiment of a computing system for processing data received from a capture device.

FIG. 5 illustrates another example embodiment of controller 12 implemented as a computing system 220. The computing system environment 220 is only one example of a suitable computing system and is not intended to suggest any limitation as to the scope of use or functionality of the presently disclosed subject matter. Neither should the computing system 220 be interpreted as having any dependency or requirement relating to any one or combination of components illustrated in the exemplary operating system 220. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 5 illustrates operating system 225, application programs 226, other program modules 227, and program data 228 as being currently resident in RAM.

The computer 241 may also include other removable/non-removable, volatile/nonvolatile computer storage media. By way of example only, FIG. 5 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 5, provide storage of computer readable instructions, data structures, program modules and other data for the computer 241. In FIG. 5, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). For example, capture device 20, including cameras 26, 28 and microphone 30, may define additional input devices that connect via user input interface 236. A monitor 242 or other type of display device is also connected to the system bus 221 via an interface, such as a video interface 232. In addition to the monitor, computers may also include other peripheral output devices, such as speakers 244 and printer 243, which may be connected through an output peripheral interface 233. Capture Device 20 may connect to computing system 220 via output peripheral interface 233, network interface 237, or other interface.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 5. The logical connections depicted include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 5 illustrates application programs 248 as residing on memory device 247. It will be appreciated that the network connections shown are exemplary and other means of establishing a communications link between the computers may be used.

Either of the systems of FIG. 4 or 5, or a different computing system, can be used to implement controller 12 shown in FIGS. 1-2. As explained above, controller 12 captures body positions and/or movements and sounds of the users, and recognizes these inputs as body commands and sound commands, and employs those recognized body commands and sound commands to control a video game or other application. For example, a user's motions can be used to control an avatar and/or object in a video game, or they may be used in combination with voice commands to the same ends. In some embodiments, the system can simultaneously track multiple users and allow the motion and sounds of multiple users to control the application. In other embodiments, the user's motions can be recognized as a hand gesture to point to a specific item in a list of displayed items, and a user's speech can be recognized as a voice command to take action with regard to the specific item being pointed to. In yet other embodiments, the gesture may be no more than a positioning of the hand so that a cursor position is established on the monitor. Then, sound input such as a voice command is used in combination with the cursor position to provide control within the application. For example, when the cursor is positioned over an object on the display, such as a particular movie, a voice command of "PLAY THAT" will cause the movie to be played.

Figure 6:
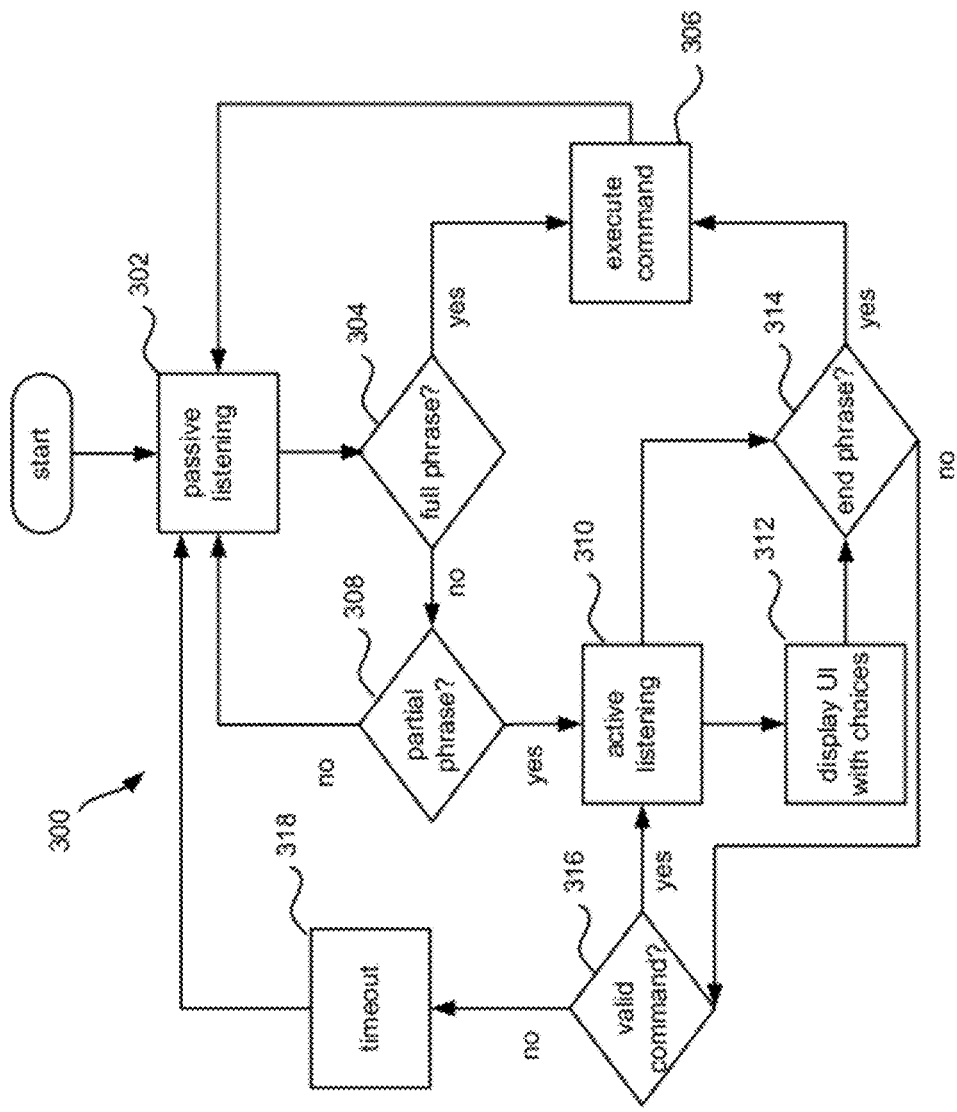
FIG. 6 is a flow chart describing one embodiment of a process for user interaction with a computing system using voice commands.

FIG. 6 is a simplified flow chart describing one embodiment of a process 300 for interacting with a user based on voice commands. Initially, the system 10 is placed into a "passive listening" mode, ready to receive voice commands. The user speaks a command, and at step 304, the system determines whether the command is a recognized full phrase voice command, such as "Xbox go to video library." If so, then the system immediately executes the command in step 306, and returns to the passive listening state at step 302.

If the spoken command is not recognized as a full phrase voice command, then the system determines at step 308 whether the spoken command is a partial phrase voice command. If so, then the system continues to listen at step 310 in an "active listening" mode for further voice commands. When an end phrase is spoken and recognized in step 314, then the system proceeds to execute the command in step 306. If an end phrase is not spoken, then the system checks to see at step 316 to see if the partial phrase is part of a valid command. If so, the system returns to the active listening mode in step 310. If the spoken command is not recognized as a partial phrase voice command, then after a brief timeout at step 318, the system returns to the passive listening mode at step 302.

If the user is not familiar with the system and its commands, then it may be difficult for the user to speak the appropriate commands. Thus, advantageously, the system also provides help to the user in the form of a user interface ("UI") on display monitor 15, which is displayed in step 312 after recognizing the partial command and entering an active listening mode. The UI displays a set of additional commands that are available to use with the recognized partial command received in step 308. Thus, the user can speak the command from personal knowledge, or wait for the UI to list the available choices.

Figure 7A:
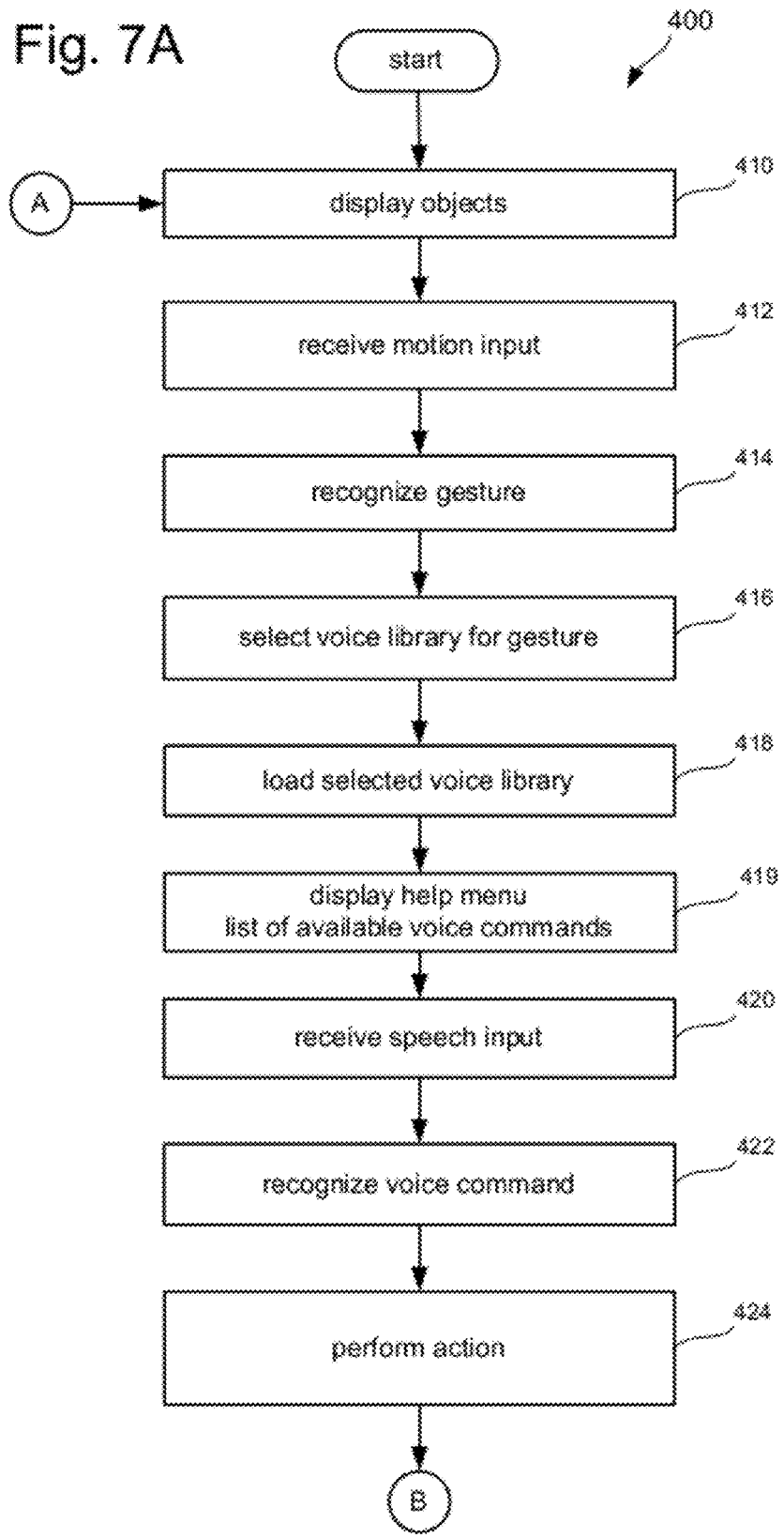
FIG. 7A is a flow chart describing one embodiment of a process for user interaction with a computing system using hand gestures and voice commands.

FIG. 7A is a flow chart describing an embodiment of a process 400 for user interaction with controller 12 using gestures and voice commands. In step 410, objects are displayed by the system 10 on display monitor 15, such as games, movies, or other multimedia content. In step 412, the capture device 20 captures a user movement, and in step 414, the system recognizes the movement as a defined command gesture, for example, a hand gesture. Having recognized the gesture, the system selects a voice library (such as voice library 70, 72 . . . 76 shown in FIG. 2) having a limited set of voice commands that correspond to the gesture in step 416. The voice commands corresponding to the recognized gesture are then loaded into the voice recognizer engine 56 in step 418. In step 419, a contextual help menu is displayed on the monitor 15 that shows the voice commands which are available for use with the recognized gesture.

In step 420, the microphone 30 in capture device 20 captures speech input as spoken by the user. Using the voice library that has been loaded into the voice recognizer engine 56, the system recognizes the speech input as a voice command in step 422. In step 424, the system performs the action associated with the recognized speech command.

Figure 7B:
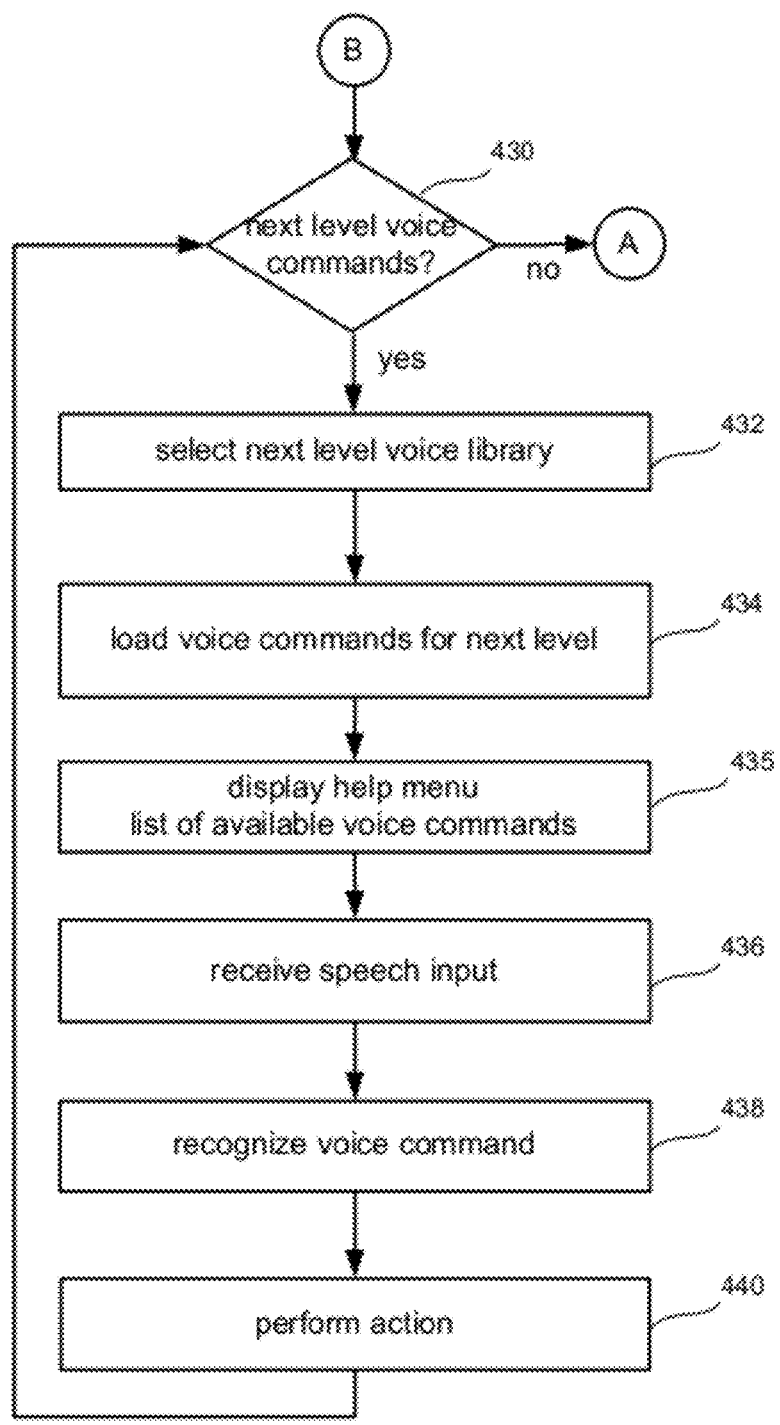
FIG. 7B is a flow chart describing further steps in addition to those shown in FIG. 7A for user interaction with a computing system using hand gestures and voice commands.

Further process steps may be performed as shown in FIG. 7B. For example, in step 430 (which is performed after step 424), the system determines whether there is another level of voice commands that correspond to the voice command recognized in step 422. If not, then the process returns to step 410 on FIG. 7A. If there is another level of voice commands, then the voice library for the next level of voice commands is selected at step 432, and these voice commands are loaded into the voice recognizer engine 56 in step 434. In step 435, a contextual help menu is displayed listing the available voice commands that may be used with the recognized voice command. Speech input from the user is captured at step 436. The speech input is processed and recognized in step 438, and, the action associated with the recognized speech input is performed in step 440. After step 440, the process returns to step 430 to determine whether there is another hierarchical level of voice commands.

FIG. 7C is a flow chart describing a process for receiving motion data and recognizing a gesture. The process depicted in FIG. 7C is one example implementation of steps 412 and 414 of FIG. 7A. A depth image is sensed/received in step 750 and sent to controller 12 in step 452. At step 454, the RGB camera 28 senses a visual image and sends the image to controller 12 in step 456. The images from cameras 26 and 28 are used to update the motion tracking algorithm in step 458. Next, the updated motion tracking information, along with the depth image and visual image, are provided to the gesture recognizer engine 54 in step 460. The gesture recognizer engine 54 processes the data in step 462, and appropriate filters are called in step 464.

Figure 7D:
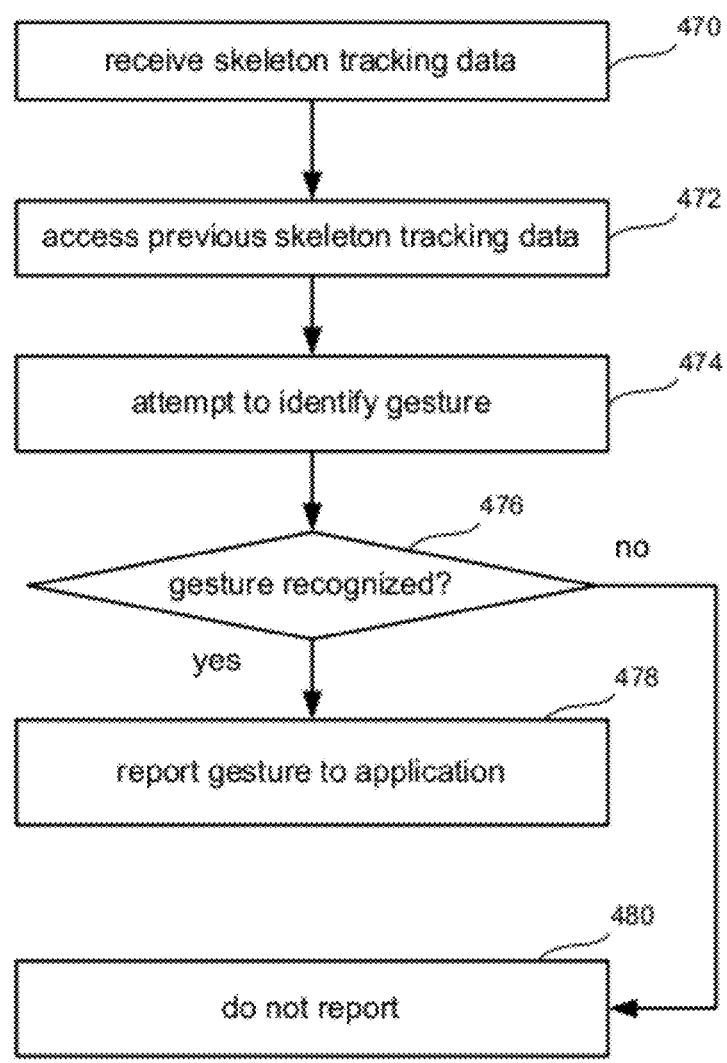

FIG. 7D is a flow chart describing a process for identifying a gesture. The process depicted in FIG. 7D is one example implementation of steps 462 and 464 of FIG. 7B. In t step 470, the gesture recognizer engine 54 receives skeleton tracking data from the tracking module 50. In step 472, the gesture recognizer engine 54 receives previous skeleton tracking data from the tracking module 50. Using the skeleton tracking data and appropriate fillers, the engine 54 attempts to recognize the gesture in step 474. If the gesture is recognized in step 476, then the gesture will be reported back to the application in step 478. If the gesture is not recognized, it is not reported to the application in step 480.

Figure 7E:
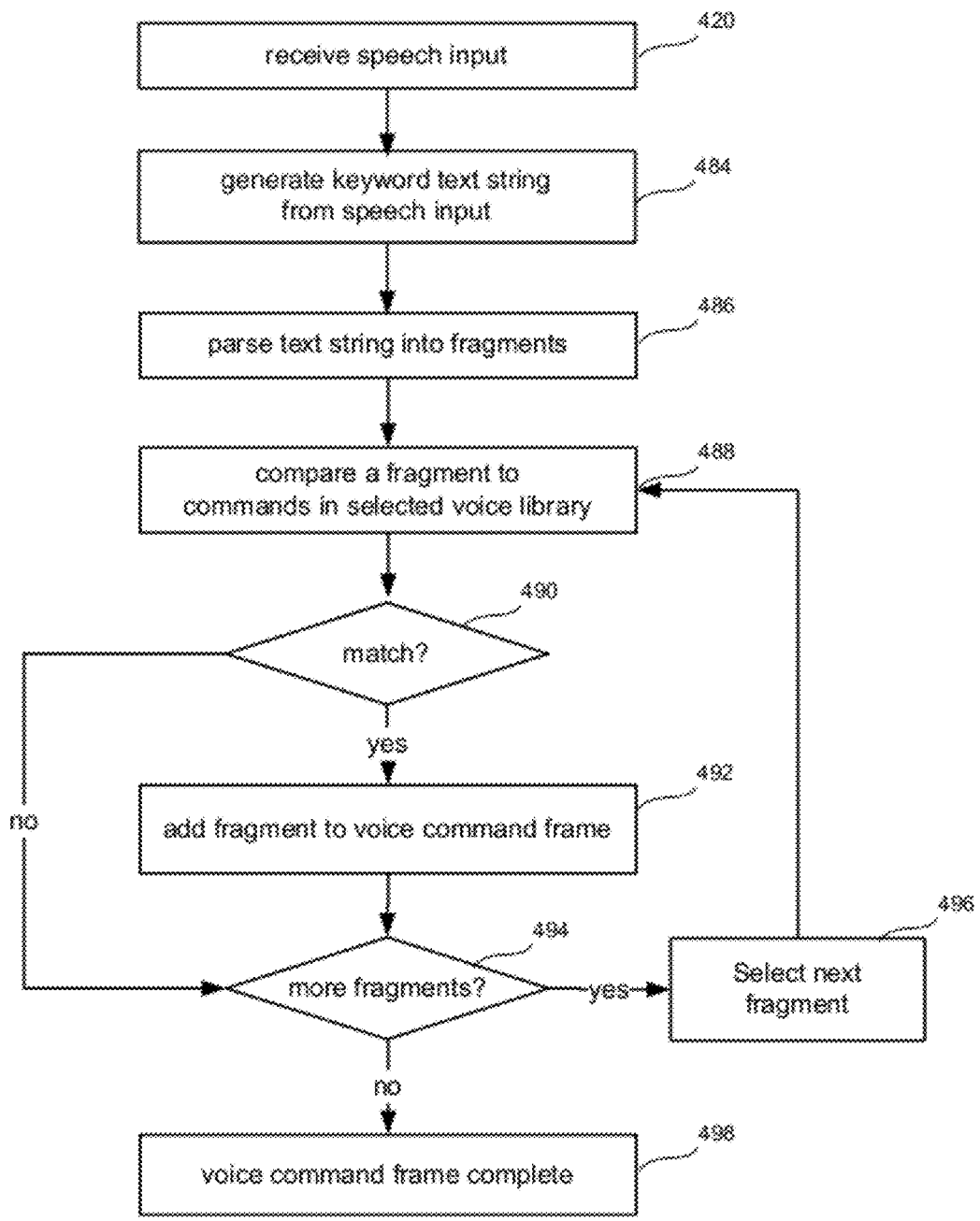
FIG. 7E is a flow chart describing additional details for recognizing voice commands in the process shown in FIG. 7A.

FIG. 7E is a flow chart describing the process for recognizing voice commands. The process depicted in FIG. 7E is one example implementation of step 422 of FIG. 7A. Step 420 from FIG. 7A is reproduced on FIG. 7E, where the controller 12 receives speech input captured from microphone 30 and initiates processing of the captured speech input. In step 484, the controller 12 generates a keyword text string from the speech input, then in step 486, the text string is parsed into fragments. In step 488, each fragment is compared to relevant commands in the selected voice library that was selected in step 416 of FIG. 7A. If there is a match between the fragment and the voice library in step 490, then the fragment is added to a voice command frame, and the process checks for more fragments in step 494. If there was no match in step 490, then the process simply jumps to step 494 to check for more fragments. If there are more fragments, the next fragment is selected in step 496 and compared to the voice library in step 488. When there are no more fragments at step 494, the voice command frame is complete, and the voice command has been identified.

Figure 8A:
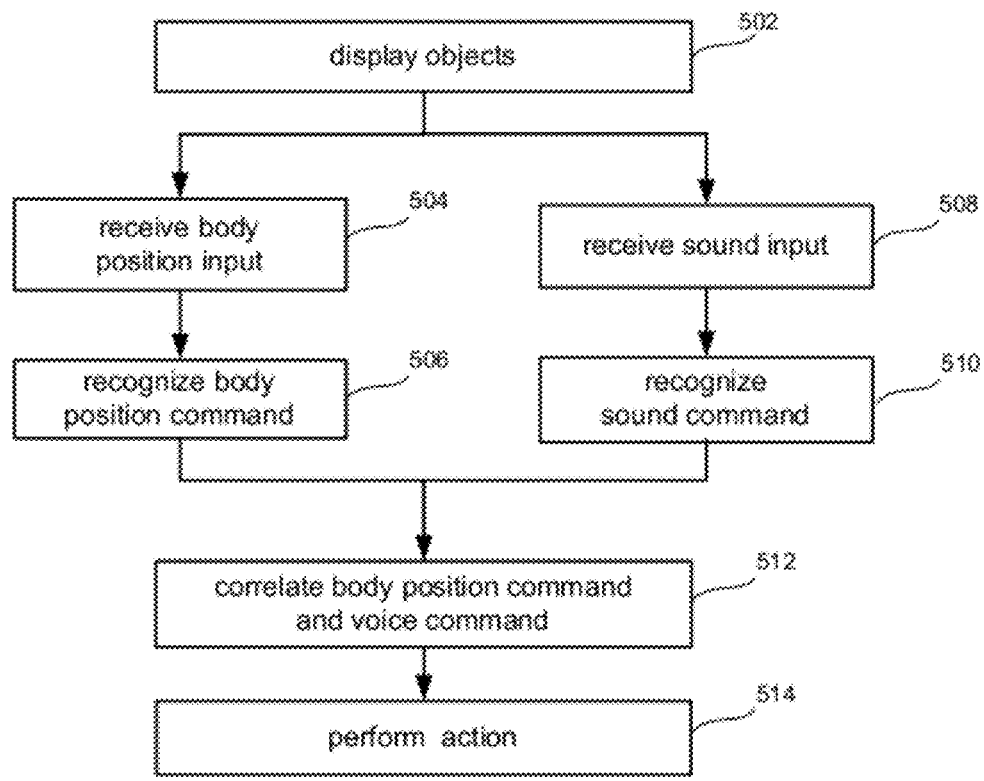
FIG. 8A is a flow chart describing an alternative embodiment of a process for user interaction with a computing system using hand gestures and voice commands.

FIG. 8A is a flow chart describing an alternative embodiment of a process for interacting with a user based on body position commands and sound commands. In FIG. 8A, a body position command and a sound command are received virtually simultaneously, and therefore the body position commands may be correlated with the sound command, or vice versa, to enhance the reliability and confidence level associated with making a determination as to what commands were actually received via body position and sound inputs. In step 502, objects are displayed on display monitor 15, such as games, movies, or other multimedia content. In step 504, the capture device 20 captures a user's body position and/or movement, and in step 506, the system recognizes the body position and/or movement as a defined command, for example, a hand gesture. Virtually simultaneously, the microphone 30 in capture device 20 captures sound input as generated by the user in step 508. Using the voice libraries of the voice recognizer engine 56, the system recognizes the sound input as a voice command in step 510. In step 512, the system correlates the gesture with the voice command by using the gesture to confirm the voice command, and/or using the voice command to confirm the gesture. Further details are provided in FIGS. 8B-8D below. In another example, the gesture may be interpreted as hand clapping, and the sound input may also be interpreted as hand clapping, in which case the interpretation of the compound command is given a high confidence value as a result of both commands agreeing. By utilizing the interpreted meaning of both the captured gesture and sound/voice command, the system has an increased confidence value that the interpreted meanings are accurate. In step 514, the system performs the action associated with the combination of recognized gesture and speech command.

Figure 8B:
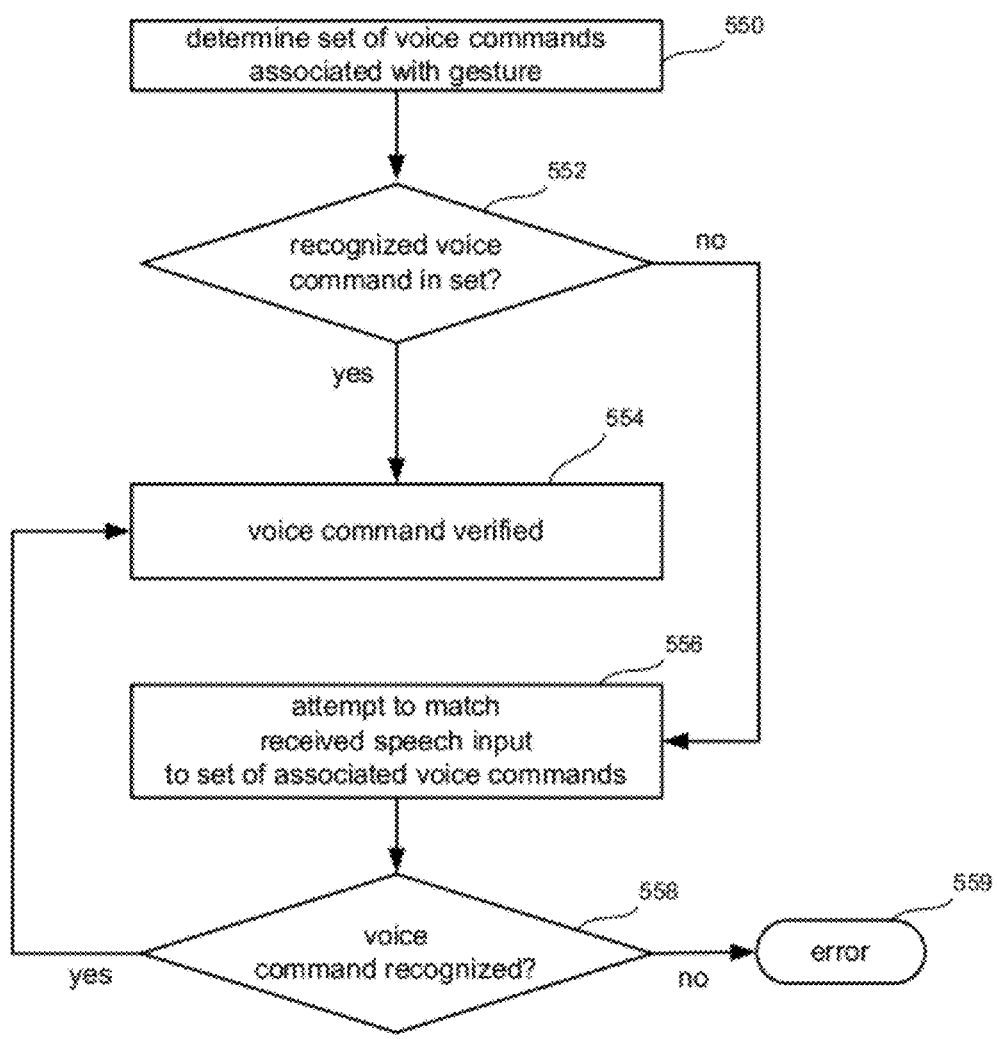
FIG. 8B is a flow chart describing one option for correlating a gesture with a voice command in accord with FIG. 8A.

FIG. 8B is a flow chart describing one option for correlating the gesture and voice command in step 512 of FIG. 8A. For example, having recognized a gesture in step 506 of FIG. 8A, then the set of voice commands associated with the recognized gesture may be determined in step 550. Next, it is determined in step 552 whether the voice command that was recognized in step 510 of FIG. 8A is one of the voice commands associated with the recognized gesture. If so, then in step 554 the voice command has been verified. If not, then in step 556, an attempt is made to match the received speech input with one of the voice commands in the set associated with the recognized gesture. If the attempt results in a successful match in step 558, then the voice command is verified in step 554. If not, then the recognition scheme has been unsuccessful and ends in error at step 559.

Figure 8C:
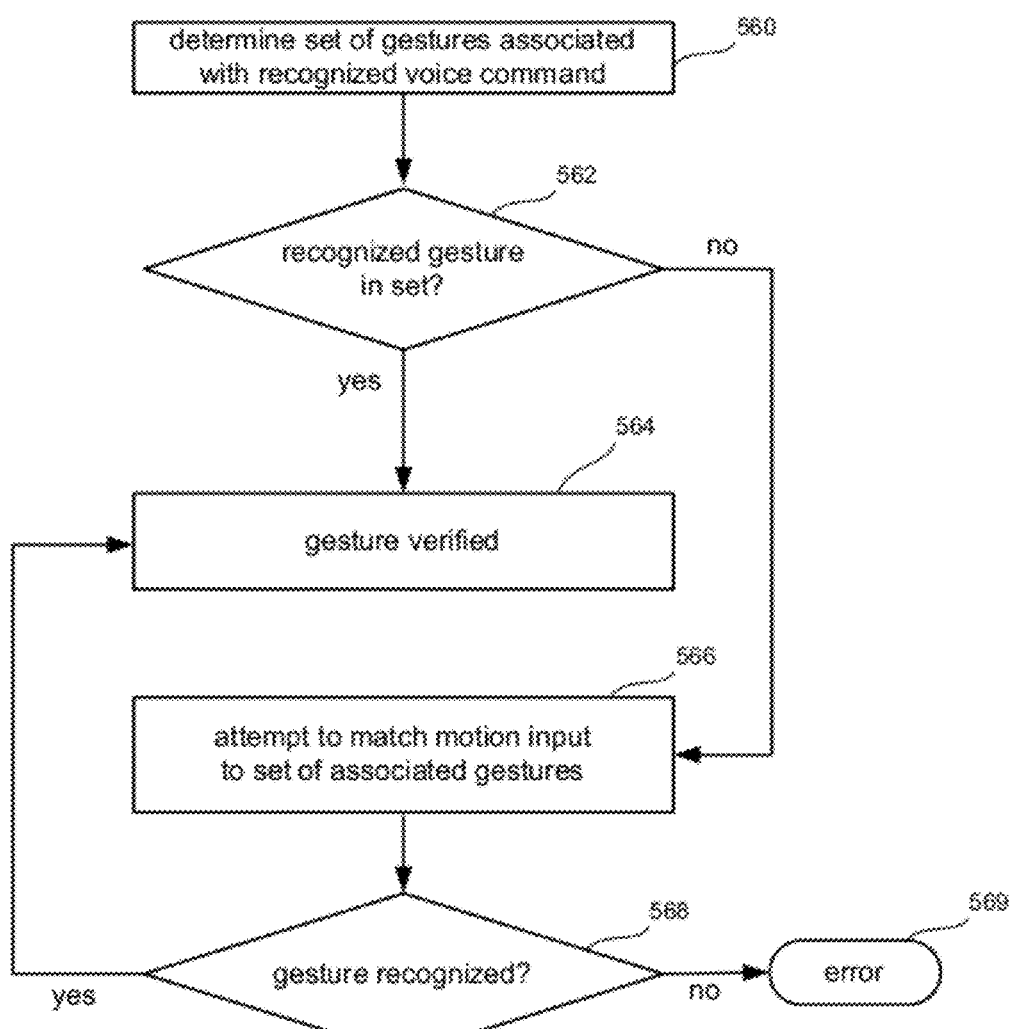
FIG. 8C is a flow chart describing another option for correlating a gesture with a voice command in accord with FIG. 8A.

FIG. 8C is a flow chart describing another option for correlating the gesture and voice command in step 512 of FIG. 8A. For example, having recognized a voice command in step 510 of FIG. 8A, then the set of gestures associated with the recognized voice command may be determined in step 560. Next, step 562 determines whether the gesture that was recognized in step 506 of FIG. 8A is one of the gestures associated with the recognized voice command. If so, then in step 564 the gesture has been verified. If not, then in step 566, an attempt is made to match the received motion input with one of the gestures in the set associated with the recognized voice command. If the attempt results in a successful match in step 568, then the gesture is verified in step 564. If not, then the recognition scheme has been unsuccessful and ends in error at step 569.

FIG. 8D is a flow chart describing another option for correlating the gesture and voice command in step 512 of FIG. 8A. For example, having recognized a gesture in step 506 and a voice command in step 510 of FIG. 8A (repeated here), then a weight is assigned to the gesture in step 570, and a weight is assigned to the voice command in step 571. In one embodiment, the weights are assigned based on the quality of the data and/or the reliability of the determination of the recognized gesture or voice command. For example, if the sound sensed by the microphone has a lot of noise, then the weight is lower. If the gesture recognizer engine is confident of the recognized gesture, the weight can be higher.

In step 572, it is determined which recognized command has the higher weight. If the gesture has a higher weight (and therefore a higher confidence value), then in step 573, the set of voice commands associated with the recognized gesture is determined. In step 574, it is determined whether the recognized voice command is within the set of voice commands associated with the recognized gesture. If so, then in step 575, the voice command is verified. If not, then in step 576, the controller 12 attempts to match the speech input with any of the set of voice commands associated with the recognized gesture. If there is a match in step 577, then the voice command is verified in step 575, and if not, then the recognition scheme resulted in an error.

If the voice command has a higher weight than the gesture in step 572, then in step 577, the set of gestures associated with the recognized voice command is determined. In step 578, it is determined whether the recognized gesture is within the set of gestures associated with the recognized voice command. If so, then in step 579, the gesture is verified. If not, then in step 580, the controller 12 attempts to match the motion input with any of the set of gestures associated with the recognized voice command. If there is a match in step 581, then the gesture is verified in step 579, and if not, then the recognition scheme resulted in an error.

FIG. 9A is a flow chart describing another embodiment of a process for interacting with a user based on gestures and voice commands. FIG. 9A is similar to the embodiments of FIGS. 7A-7B, except that recognized gestures cause the system to change states, as further described below. In step 520, games or other objects are displayed by the system 10 on display monitor 15. In step 522, the capture device 20 captures a user movement, and in step 524, the system recognizes the movement as a defined hand gesture. In step 526, the system changes states based on the recognized gesture. For example, if the user selects a movie, the system changes state to a movie playback state. The system then updates the display in step 528 to show other objects or features, such as controls for the movie playback state. The system then selects a voice library in step 530 (such as voice library 70, 72 ... 76 shown in FIG. 2) having an appropriate and limited set of voice commands that are available for that state, and which thus correspond to the gesture in step 416, and loads the voice commands into the voice recognizer engine 56. In step 532, the microphone 30 in capture device 20 captures speech input from the user. In step 534, the system recognizes the speech input as a voice command based on processing in the voice command recognizer 56. In step 536, the system performs the action associated with the combination of the recognized gesture and speech command, and updates the display to reflect the current state.

In step 538, the system determines whether there is another level of voice commands that correspond to recognized gesture/voice command combination. If not, then the process returns to step 522 prepared to receive further input from the capture device. If there is another level of voice commands, then the voice library for the next level of voice commands is selected and loaded into the voice recognizer engine 56 at step 540. The process then returns to step 532 prepared to capture further speech input.

The combination of gestures and voice commands are thus intended to improve the reliability and confidence associated with data captured by capture device 20. For example, a single gesture can be used with a limited number of commands to provide an effective control tool which is intuitive and easy to both learn and use. Several examples of user interfaces will further illustrate the advantages associated with combining gestures with voice commands.

Figure 9B:
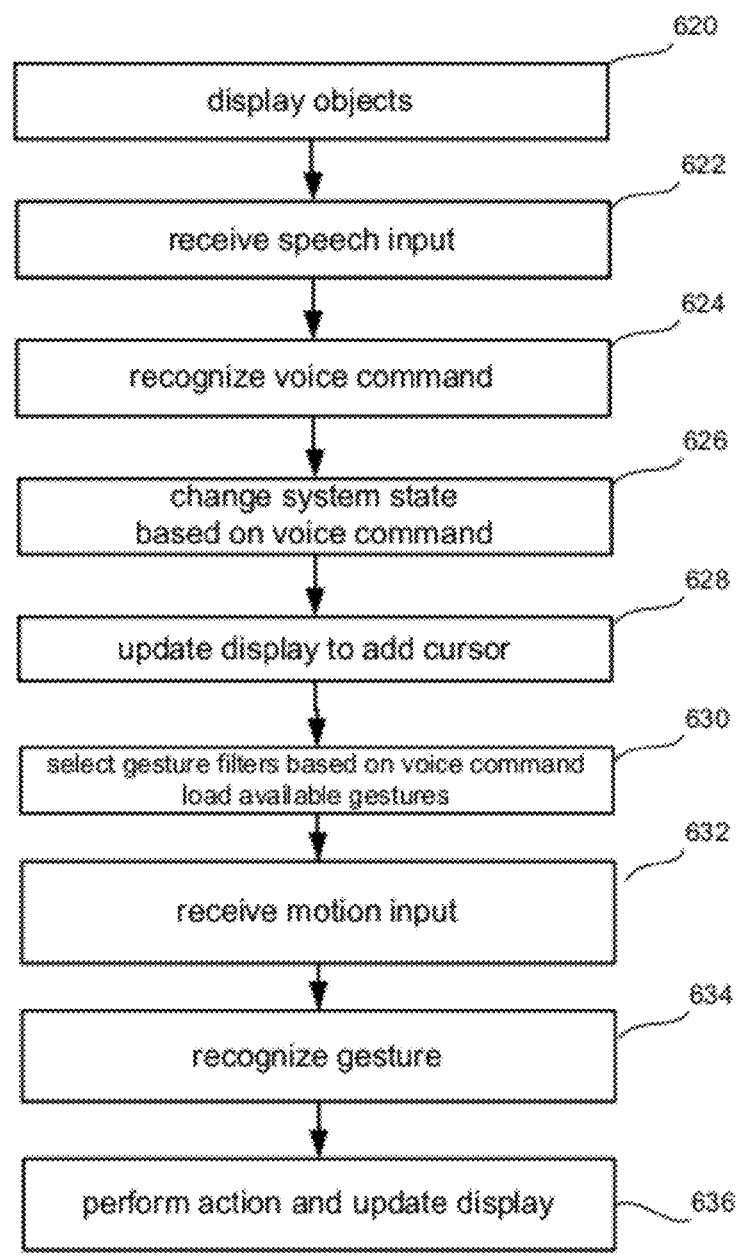
FIG. 9B is a flow chart describing an alternative embodiment of a process for user interaction with a computing system using hand gestures and voice commands.

FIG. 9B is a flow chart describing another embodiment of a process for interacting with a user based on gestures and voice commands. FIG. 9B is similar to FIG. 9A, except that recognized voice commands cause the system to change states, as further described below.

In step 620, objects are displayed by the system 10 on display monitor 15. In step 622, the microphone 30 in capture device 20 captures a sound, and in step 624, the system recognizes the sound as a defined voice command. In step 626, the system changes states based on the recognized voice command. For example, if the user says "PLAY," the system changes state to a movie playback state. The system then updates the display in step 628 to show a cursor on the display. The system then selects a gesture filter in step 630 (such as filter 60, 62 ... 66 shown in FIG. 2) having an appropriate and limited set of gestures that are available for that state, and loads the gestures into the gesture recognizer engine 56. In step 632, the camera 23 in capture device 20 captures a body position or gesture input from the user. In step 634, the system recognizes the body position input as a predefined gesture based on processing in the gesture recognizer engine 54. In step 636, the system performs the action associated with the combination of the recognized gesture and speech command, and updates the display to reflect the current state.

Figure 9C:
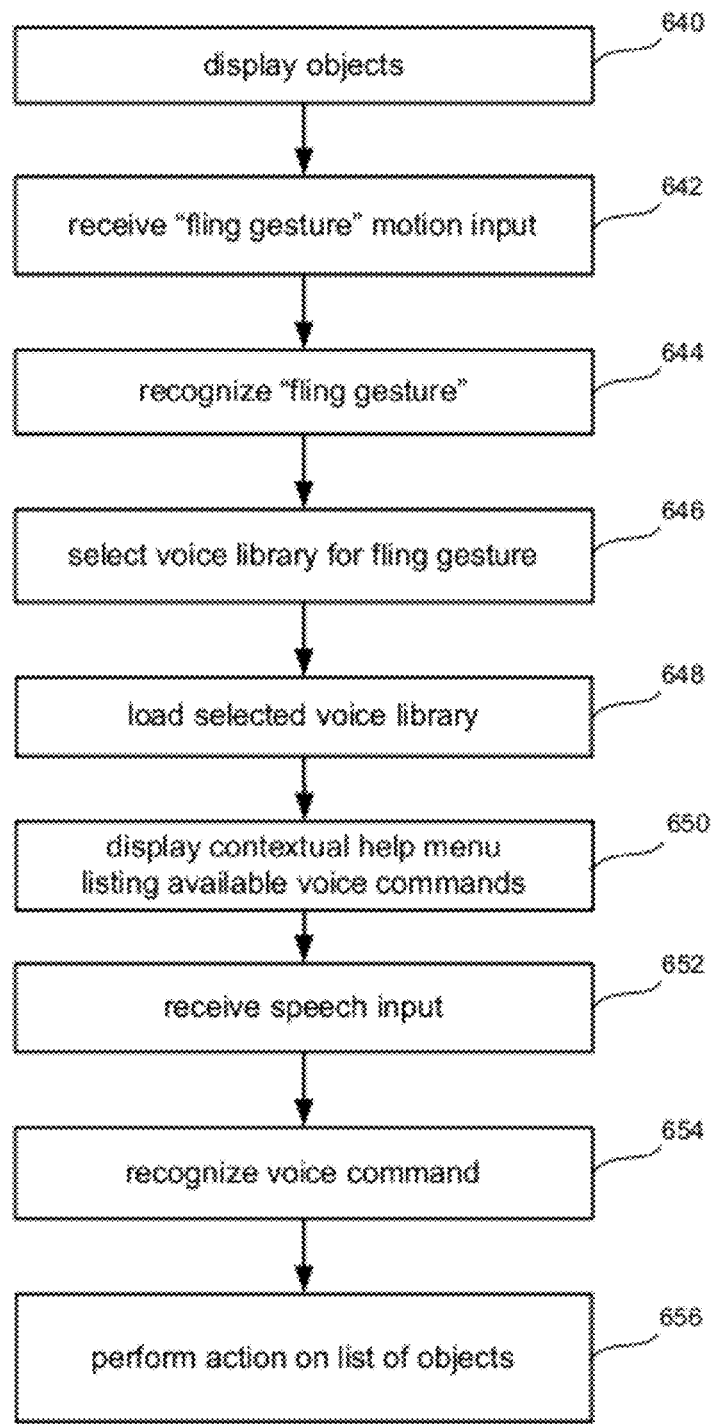
FIG. 9C is a flow chart describing one embodiment of a process for user interaction with a computing system using a specific hand gesture and contextual voice commands.

FIG. 9C is a flow chart describing an embodiment for user interaction with controller 12 using a specific "fling gesture," namely, where the user flings his hand in an outward or circular motion to indicate that a list of objects should be set in motion, for example, to scroll through all selections in the list of objects. This embodiment is similar to that depicted in FIG. 7A except that a specific gesture is contemplated.

In step 640, objects are displayed by the system 10 on display monitor 15. In step 642, the capture device 20 captures a user movement, namely the "fling gesture" described above, and in step 644, the system recognizes the "fling" movement as a defined command gesture. Having recognized the gesture, the system selects a voice library (such as voice library 70, 72 ... 76 shown in FIG. 2) in step 646 having a limited set of voice commands that correspond to the fling gesture recognized in step 644. The voice commands corresponding to the recognized gesture are then loaded into the voice recognizer engine 56 in step 648, and in step 650, a contextual help menu is displayed on the monitor 15 that shows the voice commands which are available for use with the recognized gesture.

In step 652, the microphone 30 in capture device 20 captures speech input generated by the user. Using the voice library that has been loaded into the voice recognizer engine 56, the system recognizes the speech input as a voice command in step 654. In step 656, the system then performs the action associated with the recognized speech command on the list of objects, or on a specific selected object.

Figure 10A:
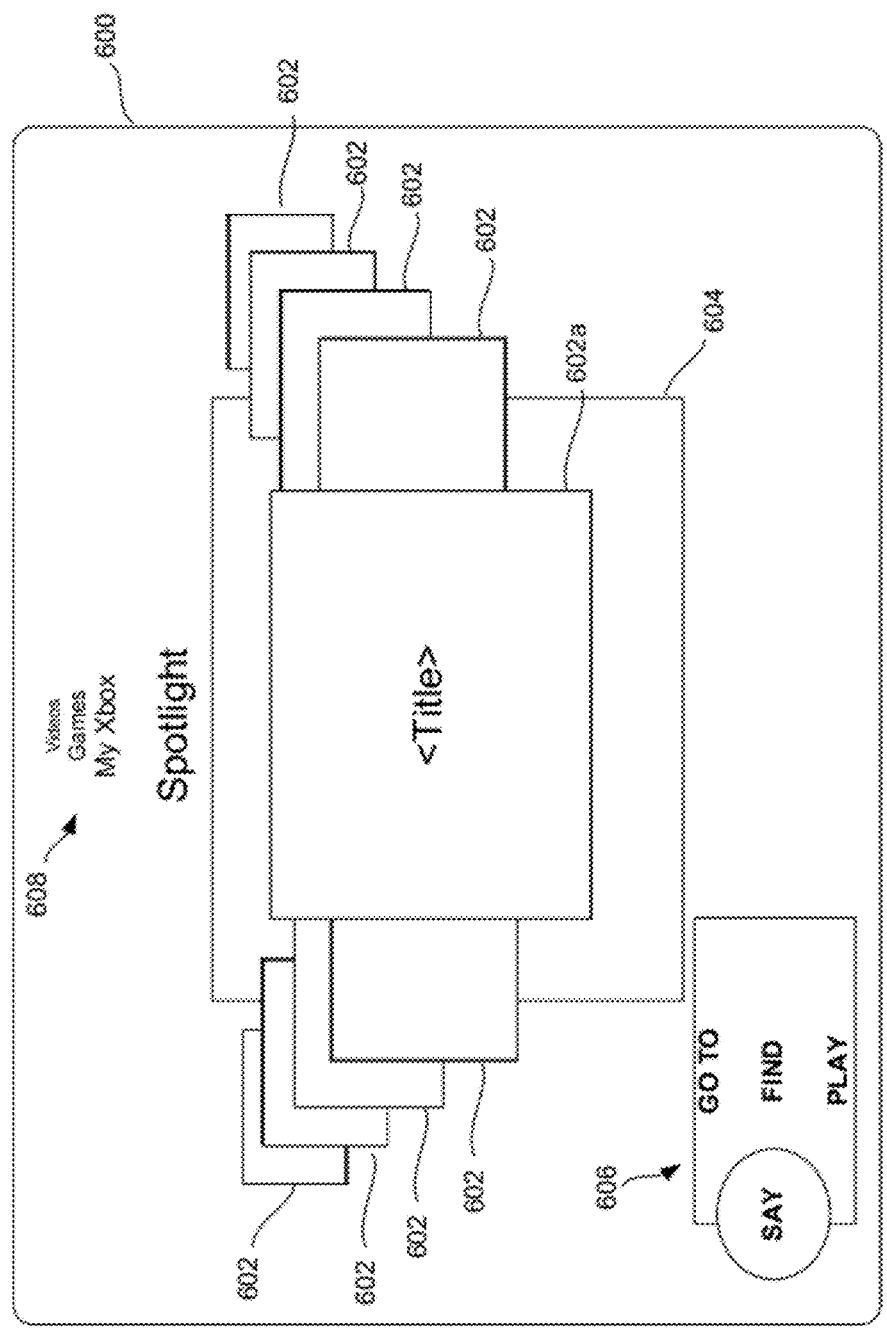
FIG. 10A is an illustration of a first level user interface implementing the flow chart of FIG. 7A.

FIG. 10A is an illustration of a first level user interface 600 implemented as part of the process of the flow chart of FIG. 7A. Thus, a plurality of objects 602, such as movies or video games, are displayed in the interface 600 in accord with step 410, with the objects spread across the width of the interface. A featured object 602a is front and center in the interface, and was selected by pointing at the object (step 412), which is recognized as a selection step (step 414). The user interface may include a highlight box 604 that contains the featured object. A helpful user voice command menu 606 is shown in the bottom left hand corner of the interface 600, and the available voice commands for the current state of the system are shown, in accord with step 419. For example, the menu may include the word "SAY" to make clear to the user that the adjacent words in the menu are available voice commands, and in this state, the available voice commands are "GO TO," "FIND" and "PLAY." Thus, the user may GO TO another state or mode of operation, or may want to FIND or PLAY a specific title. A listing 608 of available states or modes for the system is provided at the top of the display, and the user can scroll through these choices to select a state, for example, with a pointing motion. In FIG. 10A, the selected state is "SPOTLIGHT," which may be used to feature new content, for example. Other choices, such as "MY XBOX" or "GAMES" or "VIDEOS" may be selected by using appropriate gestures and/or voice commands. For example, the motion of pointing to the list 608 and the waving the hand in a circle may be recognized in step 414 as a command to scroll through the list.

Figure 10B:
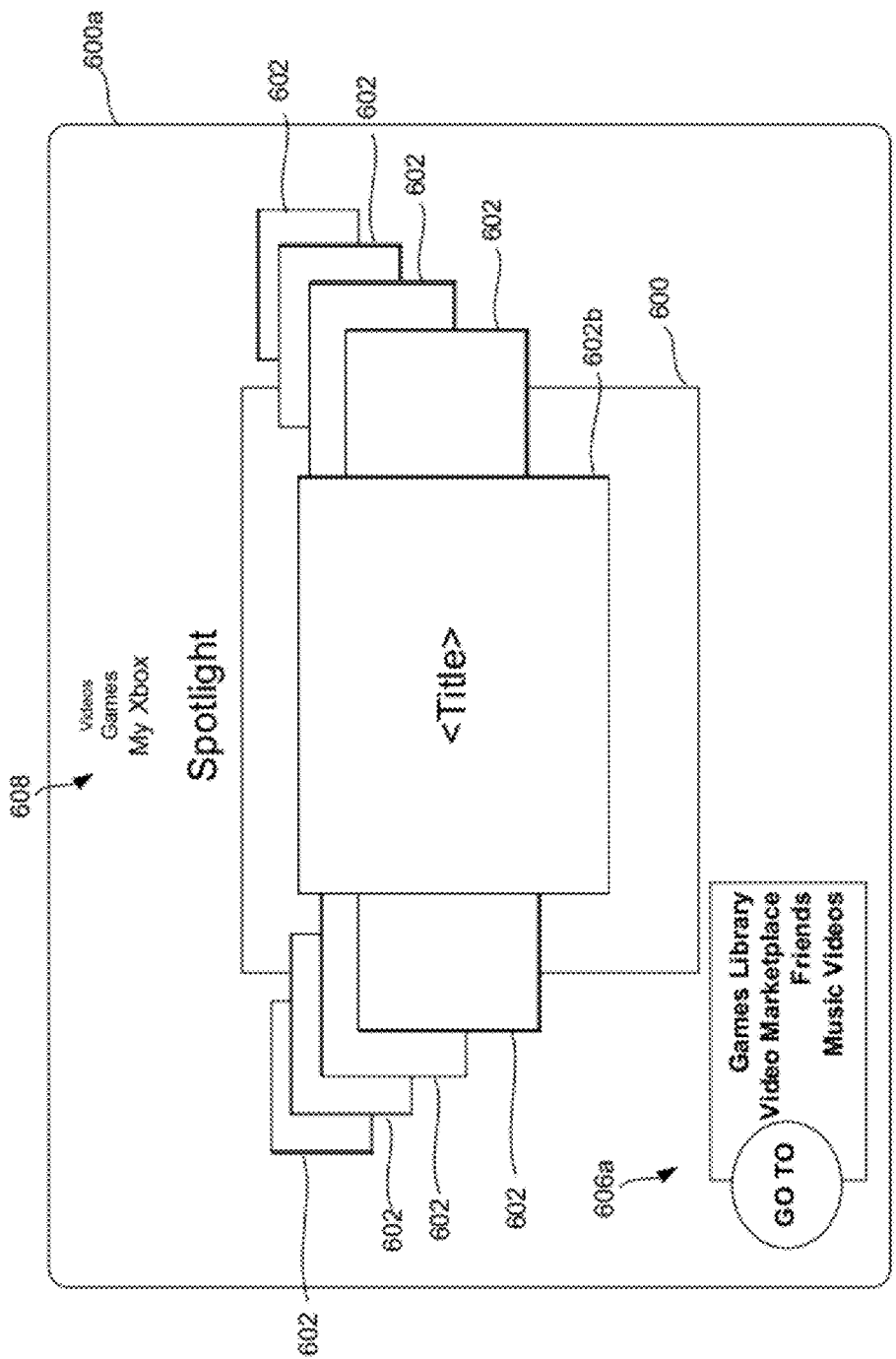
FIG. 10B is an illustration of a second level user interface implementing the flow chart of FIG. 7B.

FIG. 10B is an illustration of a next level user interface 600a implementing the flow chart of FIG. 7B. For example, if you said GO TO in response to display of the menu 606 in FIG. 10A, then when that command is recognized in step 422 of FIG. 7A, the action is performed as in step 424, and if there is another level of voice commands associated with the current state (step 430 is FIG. 7B), then another voice library is selected in step 432, and the next set of voice commands is loaded into the recognizer engine 56, as in step 434. The display is updated to show these new choices in menu 606a at step 435. Thus, in response to the voice command GO TO, the help menu is updated to list the next set of voice command choices, i.e., a list of places the user can go to.

Figure 10C:
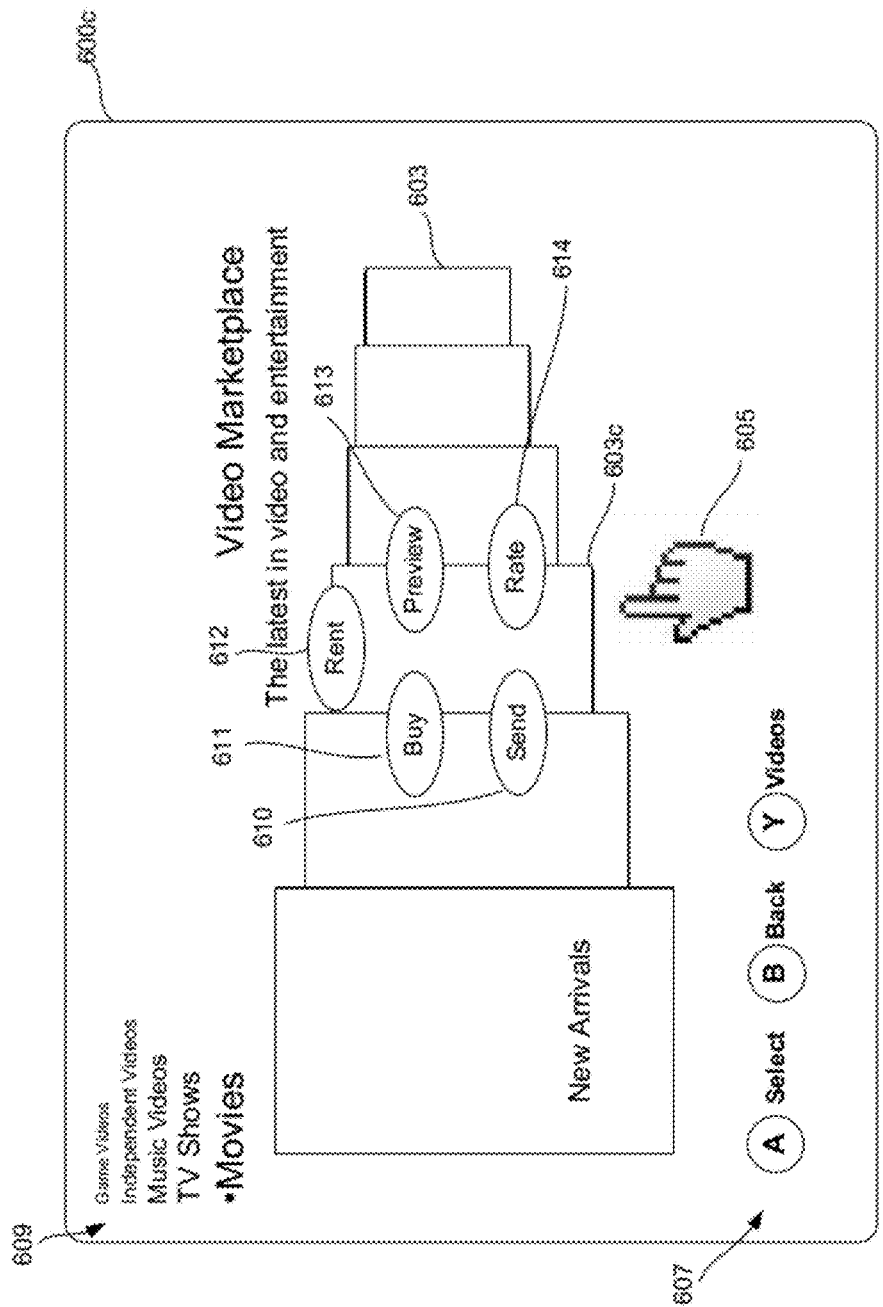
FIG. 10C is an illustration of a third level user interface.

FIG. 10C is an illustration of a next level user interface 600c. For example, if the user said VIDEO MARKETPLACE in response to the display of menu 606a in FIG. 10B (or alternatively, said the entire command GO TO VIDEOMARKETPLACE in response to the display of menu 606 in FIG. 10A), then a new interface 600c is displayed as in step 435 with an updated next level voice command menu 607 and a new state menu 609. This example shows that a hierarchical structure can be provided whereby a limited set of voice commands can be loaded for recognition on each level of the scheme. Also, in this embodiment, objects 603 are displayed in a slightly different manner in this interface, although objects could be displayed in any desired manner, according to design preference.

In this embodiment, a hand pointer 605 is illustrated. In some applications, controller 12 may render the hand pointer 605 to track the movements of the user's hand. In response to hand pointer 605 selecting object 603a, as captured and recognized in steps 412 and 414 of FIG. 7A, a contextual menu is displayed around object 603a listing all the available choices for action with voice commands relative to that object, as in step 419. For example, in the illustrated interface 600c, five small balloons 610, 611, 612, 613, 614 are arranged around the selected object 603a listing voice commands that are applicable for this object. In this state, the user could choose to say SEND, BUY, RENT, PREVIEW or RATE, and the action would be applied to the selected object 603a.

In general, those skilled in the art to which this disclosure relates will recognize that the specific features or acts described above are illustrative and not limiting. Rather, the specific features and acts described above are disclosed as example forms of implementing the claims. Accordingly, the scope of the invention is defined by the claims appended hereto.

We claim:

1. A method for controlling a computing system, comprising:
   displaying one or more objects on a display monitor;
   receiving body position data from a sensor;
   recognizing a gesture in relation to the one or more objects based on the received body position data;
   choosing a subset of a set of sound commands based on the recognized gesture, the set of sound commands includes multiple subsets, each subset is associated with one or more gestures and sound command recognition data for the respective subset;
   loading sound command recognition data for the chosen subset of sound commands;
   receiving sound input from a microphone;
   recognizing a sound command from the sound input;
   correlating the recognized gesture with the recognized sound command based on a weighted confidence value associated with a recognized gesture and a weighted confidence value associated with the recognized sound command, said correlating the recognized gesture with the recognized sound command includes:
      selecting a subset of the set sound commands associated with the recognized gesture to verify the recognized sound command if the weighted confidence value associated with the recognized gesture is higher than the weighted confidence value associated with the recognized sound command;
      selecting a subset of gestures associated with the recognized sound command to verify the recognized gesture if the weighted confidence value associated with the recognized sound command is higher than the weighted confidence value associated with the recognized gesture; and
   performing an action in response to the recognized sound command.

2. The method of claim 1, wherein:
   the sound command recognition data for the chosen subset of sound commands does not have data to recognize sound commands in the set of sound commands that are not in the chosen subset.

3. The method of claim 1, further comprising:
   displaying the chosen subset of sound commands.

4. The method of claim 3, wherein the recognized gesture selects a displayed object, and wherein the chosen subset of sound commands is displayed proximate to the selected displayed object.

5. The method of claim 1, further comprising:
   after performing the action in response to the recognized sound command, loading additional sound command recognition data for a related subset of the chosen subset of sound commands;
   receiving a further sound command;
   recognizing the further sound command using the loaded additional sound command recognition data; and
   performing an action in response to the recognized further sound command.

6. The method of claim 1, further comprising:
   changing the state of the computing system based on the recognized gesture; and
   providing a hierarchical subset of sound commands related to the changed state of the computing system.

7. The method of claim 6, wherein each of the recognized gestures corresponds to a different state of the computing system, and wherein sound command recognition data for each state of the computing system defines a hierarchical subset of sound commands, wherein each hierarchical subset of sound commands is only loaded when required by the recognized gesture.

8. The method of claim 1, wherein the body position data and the sound input are received substantially simultaneously.

9. The method of claim 1, wherein the gesture provides context for the sound command or the sound command provides context for the gesture.

10. The method of claim 1, wherein the step of recognizing a sound command from the sound input further includes:
    assigning a weighted confidence value to the step of recognizing a sound command; and
    increasing the weighted confidence value when the recognized gesture agrees with the sound command.

11. An interface system for controlling a multimedia system, comprising:
    a monitor for displaying multimedia content;
    a sensor for capturing user gestures;
    a microphone for capturing user sounds; and a computer connected to the sensor, the microphone and the monitor, the computer driving the monitor to display a group of objects, the computer receives image data representing a gesture from the sensor, the computer recognizes the gesture as selecting a first object from the group of objects, the computer updates the monitor to display a first contextual menu that shows a subset of sound commands that may be used with regard to the first object, the computer receives sound data from the microphone, the computer recognizes a sound command as being from the subset of sound commands based on the received sound data, the sound command indicates a desired action with regard to the first object, the computer executes the desired action, the computer correlates the recognized gesture with the recognized sound command based on a weighted confidence value associated with the recognized gesture and a weighted confidence value associated with the recognized sound command, said computer correlating the recognized gesture with the recognized sound command includes selecting a subset of sound commands associated with the recognized gesture to facilitate the recognition of the sound command if the weighted confidence value associated with the recognized gesture is higher than the weighted confidence value associated with the recognized sound command, said computer correlating the recognized gesture with the recognized sound command includes selecting a subset of gestures associated with the recognized sound command to facilitate the recognition of the gesture if the weighted confidence value associated with the recognized sound command is higher than the weighted confidence value associated with the recognized gesture.

12. A system as in claim 11, wherein:
the subset of sound commands is organized in one or more hierarchical levels, wherein each hierarchical level is only loaded into the computer as necessary to process a gesture.

13. A system as in claim 12, wherein:
a subsequent hierarchical level of sound commands is loaded and displayed only after a sound command from a previous hierarchical level has been recognized and the desired action associated with the sound command taken.

14. A system as in claim 11, wherein:
the gesture provides context, and
the sound commands are contextual.

15. A system as in claim 11, wherein:
the gesture is used by the computer to facilitate recognition of the sound command, and the sound command is used by the computer to facilitate recognition of the gesture.

16. A system as in claim 11, wherein:
the computer displays a progressive user interface on the monitor, wherein the user interface is updated after the computer executes the desired action to include a relevant subset of sound commands.

17. A processor readable storage device having instructions encoded thereon, the instructions for programming one or more processors to perform a method for controlling a multimedia system, comprising:
displaying a group of one or more objects on a monitor;
receiving body position data from a sensor;
recognizing a gesture from the received body position data;
updating the monitor display to list a set of sound commands available in response to the recognized gesture;
receiving sound data from a microphone;
recognizing a sound command from the set of sound commands based on the received sound data;
selecting a set of sound commands associated with the recognized gesture to confirm that the sound command is properly recognized if a weighted confidence value associated with the recognized gesture is higher than a weighted confidence value associated with the recognized sound command; and
executing an action associated with the recognized sound command.

18. A processor readable storage device as in claim 17, wherein the gesture provides context for the sound commands thereby permitting a simpler and more limited set of contextual sound commands.

19. A processor readable storage device as in claim 17, wherein the gesture enhances confidence that the sound command is properly recognized, and wherein the sound command enhances confidence that the gesture is properly recognized.

20. A processor readable storage device as in claim 17, wherein a plurality of gestures are defined, and wherein each gesture is associated with a unique subset of sound commands.

* * * * *